United States Patent

Soumiya et al.

[11] Patent Number: 5,940,375
[45] Date of Patent: Aug. 17, 1999

[54] FEEDBACK CONTROL APPARATUS AND CELL SCHEDULING APPARATUS FOR USE WITH CELL EXCHANGE

[75] Inventors: Toshio Soumiya; Koji Nakamichi; Naotoshi Watanabe; Takeshi Kawasaki, all of Kanagawa, Japan

[73] Assignee: Fujitsu Limited, Kanagawa, Japan

[21] Appl. No.: 08/829,171

[22] Filed: Mar. 31, 1997

[30] Foreign Application Priority Data

Oct. 31, 1996 [JP] Japan .................................. 8-290311

[51] Int. Cl.⁶ ...................................................... H04J 3/14
[52] U.S. Cl. .......................... 370/249; 370/235; 370/253; 370/412
[58] Field of Search ..................................... 370/230, 231, 370/232, 233, 234, 235, 236, 249, 252, 253, 395, 465, 468, 412

[56] References Cited

U.S. PATENT DOCUMENTS 5,563,875  10/1996  Hefel et al. ............................. 370/249
5,566,171  10/1996  Levinson ................................. 370/412
5,659,540   8/1997  Chen et al. ............................. 370/249
5,740,159   4/1998  Ahmad et al. .......................... 370/249

FOREIGN PATENT DOCUMENTS 7-226770  8/1995  Japan .

OTHER PUBLICATIONS

The ATM Forum Technical Committee Traffic Management Specification Version 4.0; Apr. 1996; pp. 38–52.

Primary Examiner—Chi H. Pham
Assistant Examiner—Ricky Ngo
Attorney, Agent, or Firm—Helfgott & Karas, PC

[57] ABSTRACT

A feedback control apparatus whereby the traditional single control loop for available bit rate (ABR) connections is segmented into a plurality of loops that are handled in a mutually related manner for better responsiveness of ABR connection feedback control. Three control loops are illustratively formed: a closed upward feedback control loop between a source end system and a virtual destination-link unit (VD-L) for an ABR connection, a downward control loop between a destination end system and a virtual source-link unit (VS-L) for the ABR connection, and an intra-switch feedback control loop between an upstream virtual source-internal unit (VS-I) and a downstream virtual destination-internal unit (VD-I) for the ABR connection.

16 Claims, 11 Drawing Sheets

| FIELD | OCTET | BIT | DESCRIPTION | INITIAL VALUE | |
|---|---|---|---|---|---|
| | | | | RM CELL GENERATED BY SOURCE | RM CELL GENERATED BY SWITCH OR BY DESTINATION |
| Header | 1-5 | all | ATM Header | RM-VPC : VCI = 6 and PTI =110  RM-VCC : PTI = 6 | |
| ID | 6 | all | PROTOCOL IDENTIFIER | 1 | |
| DIR | 7 | 8 | DIRECTION INDICATOR | 0 | 1 |
| BN | 7 | 7 | BECN CELL INDICATOR | 0 | 1 |
| CI | 7 | 6 | CONGESTION INDICATOR | 0 | CI=1 or NI=1 or CI=NI=1 |
| NI | 7 | 5 | NO Increase | 0 or 1 | |
| RA | 7 | 4 | REQUEST/ ACKNOWLEDGE | 0 OR AS PER I.371 | |
| Reserved | 7 | 3-1 | RESERVED | 0 | |
| ER | 8-9 | all | EXPLICIT CELL RATE | LOWER THAN PCR | AS DESIRED |
| CCR | 10-11 | all | CURRENT CELL RATE | ACR | 0 |
| MCR | 12-13 | all | MINIMUM CELL RATE | MCR | 0 |
| QL | 14-17 | all | QUEUE LENGTH | 0 OR AS PER I.371 | |
| SN | 18-21 | all | SEQUENCE NUMBER | 0 OR AS PER I.371 | |
| Reserved | 22-51 | all | RESERVED | 6A FOR EACH OCTET (HEXADECIMAL) | |
| Reserved | 52 | 8-3 | RESERVED | 0 | |
| CRC-10 | 52 | 2-1 | CRC-10 | | |
| | 53 | all | | | |

FIG. 6

FEEDBACK CONTROL APPARATUS AND CELL SCHEDULING APPARATUS FOR USE WITH CELL EXCHANGE

BACKGROUND OF THE INVENTION

1. Field of the Invention

The present invention relates to techniques for averting network congestion by use of feedback control in conjunction with the ABR service.

2. Description of the Related Art

At the ATM Forum and in the ITU-T, a service system called the ABR (available bit rate) service is currently proposed. The proposed service envisages applying ATM (asynchronous transfer mode) data switching techniques to high-speed data communication networks such as a LAN (local area network) and a WAN (wide area network). The ABR service, when implemented, will feed network congestion information from an exchange back to a source end system so as to avoid network congestion. More specifically, the ABR service is a network service that allows an exchange to monitor the use status of network resources to change dynamically and correspondingly to change the transmission rate of a source end system between a peak cell rate (PCR) and a minimum cell rate (MCR), whereby the network is efficiently operated and network congestion or any loss of cells is averted. The ABR service is described below in more detail.

<ABR Service>

In a communications system utilizing the ABR service, resource management (RM) cells are used to notify end systems of network resource information. A source end system outputs an RM cell every time a predetermined number of user data cells have been transmitted. Each RM cell moves over the ATM network to reach a destination end system and loops back therefrom to the source end system.

The ATM exchange on the ATM network writes information on resources inside the exchange (bandwidth information, congestion information, etc.) to RM cells that pass therethrough. In turn, the RM cells notify the source end system of the information from the network. Upon receipt of the RM cells containing bandwidth information, congestion information and other network-related information, the source end system recalculates its own allowed cell rate (ACR) to perform communications at a rate lower than the ACR.

At the start of its transmission, the source end system submits a peak cell rate (PCR; the highest transmission rate) and a minimum cell rate (MCR; the lowest transmission rate) to the network for negotiation therewith. The source end system cannot transmit ATM cells (simply called cells hereafter) at a rate exceeding the PCR, decided upon as a result of the negotiation. For its part, the ATM network guarantees data transmission at rates above the MCR determined through the negotiation. That is, the allowed cell rate (ACR) of the source end system varies between the MCR and the PCR (MCR$\leq$ACR$\leq$PCR).

Such operations allow the ATM network to avert congestion and to recover quickly from congestion. For their part, source end systems are allowed to transmit cells at a high transmission rate when network resources are available.

<Operations of ABR End Systems>

The operations of a transmission terminal (ABR source end system) and a reception terminal (ABR destination end system) for communications based on the ABR service are subject to standardization at the ATM Forum. Some of the operations are outlined below.

ABR Source End System

A source end system transmits cells at a rate lower than the allowed cell rate (ACR) at any given point in time, as shown in FIG. 1, in the forward direction flow. In this case, the source end system outputs one RM cell every time a predetermined number of user data cells (Nrm-1) have been transmitted. Upon receipt of an RM cell, a destination end system increases the ACR by a predetermined value if a CI (congestion indicator) bit in the RM cell is found to be 0 (not congested); the system decreases the ACR, by a predetermined value if the CI bit is set to 1 (congested). Concurrently with such operations, the source end system compares an explicit rate (ER) in the RM cell with the previously recalculated ACR, and regards whichever is the lower as the new ACR. At this time, the ACR must be within the range of: MCR$\leq$ACR$\leq$PCR ABR Destination End System The destination end system terminates user data cells transmitted from the source end system and loops the received RM cells back to the source end system, as depicted in FIG. 1, in the backward direction flow. In the user data cell received immediately before any RM cell by the destination end system, an explicit forward congestion indication (EFCI) bit may be found to be 1, indicating congestion. In this case, the destination end system sets the CI bit to 1 in the RM cell in question before the RM cell is looped back to the source end system.

<Operations of the ATM Exchange>

The workings of the ATM network implementing the ABR service, i.e., those of ATM exchanges, fall into one of two principal categories: EFCI mode and ER mode.

EFCI Mode

During congestion, an ATM exchange sets the EFCI bit to each of user data cells reaching that exchange before the cells move past the exchange.

ER Mode

In view of internal resource availability and congestion status, an ATM exchange calculates the explicit rate (ER) at which to allow a source end system to transmit data. The calculated value is written to an RM cell moving past the ATM exchange in the forward direction (from source to destination) or in the backward direction (from destination to source). In this case, the ATM exchange compares the ER value in the RM cell with the ER value calculated by the exchange and writes whichever is the smaller to the RM cell.

Apart from the RM cells sent from the source end system, an ATM exchange or a destination end system may also generate RM cells for transmission to a source end system. In such a case, the ATM exchange or the destination end system sets the CI bit in the generated RM cell or writes to the RM cell an ER value calculated by the exchange or end system.

Forming part of the operations of the ATM exchange for implementing the ABR service, functions called ABR VS/VD (virtual source/virtual destination) have been established besides the dual mode workings described above. To implement the ABR VS/VD functions requires that, as shown in FIG. 2, VD functions to loop back RM cells received from upstream be installed on the upstream side of each ATM exchange (i.e., destination end system side) and that VS functions to relay or newly output RM cells downstream be installed on the downstream side of the ATM exchange (i.e., source end system side).

That is, the VS/VD functions allow ATM exchanges to generate, loop back and terminate RM cells internally, regarding any given ABR connection. This means that the ABR connection is no longer limited to a single control loop ranging from the source end system to an ATM exchange to the destination end system, to the ATM exchange to the source end system; the ABR connection may now be segmented into a plurality of control loops as indicated in FIG. 2. In the above setup, the VD functions implemented in any ATM exchange virtually simulate the functions of a destination end system, and the VS functions also implemented in the ATM exchange virtually simulate those of a source end system.

When the ABR service segments each ABR connection into a plurality of control loops, the control loops are placed under parallel feedback control for improved feedback response. This allows the ATM network to avert congestion and to recover more quickly from congestion. End systems, for their part, are allowed to transmit cells at a higher transmission rate whenever network resources are available.

Specifics of the VS/VD functions that need to be implemented are as follows:
(1) ABR source/destination operations stipulated by ATM Forum Traffic Management (TM) 4.0 (mandatory functions)
  (a) Generation and termination of RM cells (function to be included in the VS)
  (b) Calculation of the allowed cell rate (ACR) based on information set in backward RM cells received (function to be included in the VS)
  (c) Transmission of user data cells at the ACR (function to be included in the VS) (d) Loop-back of RM cells plus scheduling of out-rate RM cells (function to be included in the VD). An out-rate RM is an RM cell in which, with the free bandwidth of loop-back side channels set to 0 under ABR control, a cell loss priority (CLP) bit is set to 1 (to be described later with reference to FIG. 9) before the cell is transmitted. The out-rate RM cell (CLP=1) is more likely to be discarded in the network than RM cells in which the CLP bit is set to 0.
  (e) Operation to set the CI bit to 1 in an RM cell to be looped back upon receipt of a user data cell in which the EFCI bit is set to 1 (function to be included in the VD)
  (f) Generation of a backward explicit congestion indication (BECN) RM cell (function to be included in the VD)
(2) Transfer of the minimum cell rate (MCR) value (mandatory functions)
  (a) Transfer of the MCR value in an RM cell coming from downstream (destination end system side) and received by the VS, on to the upstream VD (source end system side)
  (b) Transfer of the MCR value in an RM cell coming from upstream and received by the VD, on to the downstream VS
(3) Functions for control between the VS and the VD within the same exchange (implementation specific)
  (a) Transfer of the ER value in an RM cell terminated by the VS inside an exchange, on to the upstream VD within the same exchange
  (b) Setting of ABR parameters for the segment to be supported
  (c) Function to calculate the ER value at a point of congestion within a switch The operations of the functions listed above are subject to standardization at the ATM Forum. Specific methods of control and concrete ways to implement systems and equipment are excluded from the objects to be standardized. For example, methods for detecting congestion status in ATM exchanges and algorithms for calculating the explicit rate (ER) are not subject to standardization.

Of the more specific VS/VD functions outlined above, those in the category (3), "Functions for control between the VS and the VD within the same exchange" have yet to be matched with effective conventional techniques.

SUMMARY OF THE INVENTION

It is therefore an object of the present invention to provide a feedback control apparatus and a cell scheduling apparatus for use with a cell exchange, whereby functions of effective control between the VS and VD within the same exchange are implemented, as are the related dynamic shaping functions.

In carrying out the invention and according to a first aspect thereof, there is provided a feedback control apparatus for use with a cell exchange (ATM exchange) allowing fixed-length cells to switch autonomously according to routing information attached to the cells, the feedback control apparatus feeding congestion status of the cell exchange back to an upstream device by use of a resource management cell (RM cell) in order to vary a cell transmission rate for the upstream device. The feedback control apparatus comprises virtual destination-link means, virtual source-link means, virtual source-internal means and virtual destination-internal means, which are outlined below.

The virtual destination-link means (VD-L 305 in FIG. 3) is used for each of a plurality of connections for terminating and looping back a forward resource management cell (F-RM cell) received over an input link (303 in FIG. 3) connected with the upstream device, the virtual destination-link means further transmitting the forward resource management cell onto an output link (304) connected with the upstream device so that the cell is returned as a backward resource management cell (B-RM cell) to the upstream device, whereby a closed upward feedback control loop (311) is formed between the upstream device and the virtual destination-link means.

The virtual source-link means (VS-L 306) is used for each of the plurality of connections for newly generating a forward resource management cell and transmitting the newly generated forward resource management cell onto an output link connected with a downstream device, the virtual source-link means further terminating a backward resource management cell looped back from the downstream device and received over an input link connected with the downstream device, the virtual source-link means further transmitting user data cells onto the output link at a rate based on information set in the terminated backward resource management cell, whereby a closed downward feedback control loop (312) is formed between the downstream device and the virtual source-link means.

In a preferred structure of the invention, the virtual source-link means may include: second buffer means (common buffer 425 in FIG. 4) used for each of the plurality of connections for temporarily accommodating user data cells received over the output highway; and second dynamic shaper means (dynamic shaper 428) used for each of the plurality of connections for reading user data cells from the second buffer means for output onto the output link at cell read intervals corresponding to an explicit rate set in the terminated backward resource management cell.

The virtual source-internal means (VS-I 307 in FIG. 3) is used for each of the plurality of connections and connected with the virtual destination-link means, for newly generating a forward resource management cell and transmitting the newly generated forward resource management cell onto an input highway (309) connected with a switch (314) inside the cell exchange, the virtual source-internal means further terminating a backward resource management cell received over an output highway (310) connected with the switch, the virtual source-internal means further transmitting user data cells onto the input highway at a rate based on information set in the terminated backward resource management cell, the virtual source-internal means further setting the rate to the newly generated forward resource management cell and feeding the information in the terminated backward resource management cell back to the upward feedback control loop via the virtual destination-link means.

In a preferred configuration of the invention, the virtual source-internal means may include: first buffer means (common buffer 406 in FIG. 4) used for each of the plurality of connections for temporarily accommodating user data cells received over the input link; and first dynamic shaper means (dynamic shaper 413) used for each of the plurality of connections for reading user data cells from the first buffer means for output onto the input highway at cell read intervals corresponding to an explicit rate set in the terminated backward resource management cell.

In another preferred structure of the invention, the virtual source-internal means may include: quality class management means (quality class filter 408 and quality class queue 409 in FIG. 4) for managing a quality class of each of the plurality of connections in accordance with quality class information attached to user data cells every time the first buffer means temporarily accommodates the user data cells for each connection; and storage area appropriation control means (address appropriation controller 410) used when the first buffer means is full of user data cells, for referencing the quality class management means to check the quality classes of the user data cells occupying the first buffer means, the storage area appropriation control means accordingly appropriating a storage area in the first buffer means from an existing user data cell of which the quality class is lower than that of the newly input user data cell, so that the appropriated storage area will temporarily accommodate the newly input user data cell.

The virtual destination-internal means (VD-I 308 in FIG. 3) is used for each of the plurality of connections and connected with the virtual source-link means, for terminating and looping back a forward resource management cell received over the output highway connected with the switch, the virtual destination-internal means further transmitting the looped-back forward resource management cell onto the input highway as a backward resource management cell destined for the virtual source-internal means, whereby an intra-switch feedback control loop (313) is formed between the virtual source-internal means inside the cell exchange and the virtual destination-internal means, and whereby the information in the backward resource management cell terminated by the virtual source-link means is fed back to the intra-switch feedback control loop.

In a further preferred structure of the invention, the feedback control apparatus may further comprise second explicit rate change means (ER compare/change unit 403 in FIG. 4) used for each of the plurality of connections for changing, based on an explicit rate set in the backward resource management cell terminated by the virtual source-internal means, an explicit rate set in the backward resource management cell looped back by the virtual destination-link means for transmission over the output link connected with the upstream device.

In an even further preferred structure of the invention, the feedback control apparatus having the first buffer means included in the virtual source-internal means may further comprise: first queue length monitor means (queue length monitor 411 in FIG. 4) used for each of the plurality of connections for monitoring quantities of user data cells temporarily accommodated by the first buffer means; and first explicit rate change means (ER change unit 402) used for each of the plurality of connections for changing, based on the result of monitoring by the first queue length monitor means, an explicit rate set in the backward resource management cell looped back by the virtual destination-link means for transmission over the output link connected with the upstream device.

In a still further preferred structure of the invention, the feedback control apparatus may further comprise fourth explicit rate change means (ER compare/change unit 420 in FIG. 4) used for each of the plurality of connections for changing, based on an explicit rate set in the backward resource management cell terminated by the virtual source-link means, an explicit rate set in the backward resource management cell looped back by the virtual destination-internal means for transmission over the input highway.

In a yet further preferred structure of the invention, the feedback control apparatus having the second buffer included in the virtual source-link means may further comprise: second queue length monitor means (queue length monitor 427 in FIG. 4) used for each of the plurality of connections for monitoring quantities of user data cells temporarily accommodated by the second buffer means; and third explicit rate change means (ER change unit 421) used for each of the plurality of connections for changing, based on the result of monitoring by the second queue length monitor means, an explicit rate set in the backward resource management cell looped back by the virtual destination-internal means for transmission over the input highway.

In the feedback control apparatus according to the first aspect of the invention as outlined above, a closed upward feedback control loop is formed for each connection between an upstream device and the virtual destination-link means; a closed downward feedback control loop is formed for each connection between a downstream device and the virtual source-link means; and a closed intra-switch feedback control loop is formed for each connection between the virtual source-internal means and the virtual destination-internal means via the switch in the cell exchange. The intra-switch feedback control loop causes the traffic status inside the cell exchange to be reflected by the explicit rate of the backward resource management cell for feedback to the virtual source-internal means. The virtual source-internal means performs traffic control based on the fed-back explicit rate. This arrangement implements control functions between the virtual source-link means and the virtual destination-link means in the same cell exchange by use of the highways for transferring user data cells without the need for providing dedicated control lines or dedicated processors for each of the connections in the cell exchange.

In the feedback control apparatus according to the first aspect of the invention, the virtual source-internal means or virtual source-link means reads cells from the temporary storage of the first or second buffer means for output onto the input highway or output link at cell read intervals corresponding to the explicit rate set in the backward resource management cell in the intra-switch feedback control loop or downward feedback control loop for each connection. This arrangement controls the high-speed traffic of cells transmitted to the switch or upstream device in the cell exchange without being affected by traffic restrictions at the source end system, whereby the responsiveness of feedback control of the variable bit rate service and the like is improved.

In the feedback control apparatus according to the first aspect of the invention, the second explicit rate change means changes, based on the explicit rate set in the backward resource management cell terminated by the virtual source-internal means, the explicit rate set in the backward resource management cell looped back by the upstream virtual destination-link means for transmission onto the output link. This arrangement allows the explicit rate in the backward resource management cell terminated by the virtual source-internal means to be transferred to the upward feedback control loop on the upstream side.

In the feedback control apparatus according to the first aspect of the invention wherein the virtual source-internal means includes the first buffer means, the first explicit rate change means changes, based on the result of monitoring of the first buffer means by the first queue length monitor means, the explicit rate set in the backward resource management cell looped back by the upstream virtual destination-link means for transmission onto the output link. This arrangement allows the traffic handling status of the virtual source-internal means to be precisely fed back to the upward feedback control loop on the upstream side.

In the feedback control apparatus according to the first aspect of the invention, the fourth explicit rate change means changes, based on the explicit rate set in the backward resource management cell terminated by the virtual source-link means, the explicit rate set in the backward resource management cell looped back by the upstream virtual destination-internal means for transmission over the input highway. This arrangement allows the explicit rate in the backward resource management cell terminated by the virtual source-link means to be transferred to the intra-switch feedback control loop on the upstream side.

In the feedback control apparatus according to the first aspect of the invention wherein the virtual source-link means includes the second buffer means, the third explicit rate change means changes, based on the result of monitoring of the second buffer means by the second queue length monitor means, the explicit rate set in the backward resource management cell looped back by the upstream virtual destination-internal means for transmission over the output link. This arrangement allows the traffic handling status of the virtual source-link means to be precisely fed back to the intra-switch feedback control loop on the upstream side.

In the feedback control apparatus according to the first aspect of the invention, when the first buffer means currently full of user data cells has received a new user data cell, the storage area appropriation control means appropriates a storage area in the first buffer means from an existing user data cell whose quality class is found to be lower than that of the newly input user data cell, so that the appropriated storage area will temporarily accommodate the newly input user data cell. This arrangement permits more detailed cell transfer control for each of the different quality classes.

In another preferred structure of the invention, the first or second buffer means may temporarily accommodate user data cells for fewer connections than a predetermined total number of connections that are allowed, and the feedback control apparatus may further comprise connection management means (VC caching memory 801 and timer 802 in FIG. 8) for managing the connections for which the first or second buffer means temporarily accommodates the user data cells.

In the above preferred system, when a user data cell for a new connection is input to the first buffer means currently full of the user data cells for the predetermined total number of allowed connections, the connection management means may remove, according to a predetermined rule, one of the currently managed connections as an object to be managed so as to add the new connection as a new object to be managed. Illustratively, when a user data cell for a new connection is input to the first buffer means currently full of the user data cells for the predetermined total number of allowed connections, the connection management means may remove the most recent of currently managed connections as an object to be managed. Alternatively, when a user data cell for a new connection is input to the first buffer means currently full of the user data cells for the predetermined total number of allowed connections, the connection management means may remove the oldest of currently managed connections as an object to be managed. In another alternative, when a user data cell for a new connection given as a variable bit rate service connection with a minimum cell rate of 0 is input to the first buffer means currently full of the user data cells for the predetermined total number of allowed connections, the connection management means may remove as an object to be managed one of currently managed variable bit rate service connections having the minimum cell rate of 0.

In a further preferred structure of the invention, the connection management means may remove as an object to be managed any of currently managed connections for which a new user data cell has yet to reach the first buffer means in a predetermined time.

The constitution according to the first aspect of the invention including the connection management means eliminates the need for providing in advance, within the first buffer means, any arrangements for storing user data cells corresponding to all connections that may occur. As a result, the first buffer means can be reduced in scale. A reduction in scale can also be achieved in the first dynamic shaper means connected with the first buffer means.

In a still further preferred structure of the invention, any of the plurality of connections may be a variable bit rate service connection, and an initial cell rate (ICR) determined upon the setting of the connection in question may be dynamically varied for each call by use of a formula:

$$ICR = BW \times \alpha$$

where, BW stands for an available bandwidth of the network and $\alpha$ represents a coefficient greater than 1 and less than 0.

According to a second aspect of the invention, there is provided a cell scheduling apparatus for use with a cell exchange allowing fixed-length cells to switch autonomously according to routing information attached to the cells, the cell scheduling apparatus being located at an appropriate point inside the cell exchange to control rates of the cells passing through the cell exchange. The cell scheduling apparatus comprises: buffer means (common buffers 406 and 425 in FIG. 4) for temporarily accommodating input cells for each of a plurality of connections; and scheduling management means (scheduling management table 901 in FIG. 9) acting when a cell corresponding to any one connection is read from the buffer means, the scheduling management means thereupon scheduling the time to read the next cell corresponding to the connection in question from the buffer means at predetermined cell read intervals regarding the connection, the scheduling management means further determining according to a predetermined rule the connection for which a cell is to be read from the buffer means at each scheduled time for a cell read.

The cell scheduling apparatus according to the second aspect of the invention may have some specific variations which are outlined below.

In one such variation of the invention, the cell scheduling apparatus may include: the same buffer means as described above; readable timing management means (readable time management table 902 in FIGS. 9 and 10) acting when a cell corresponding to any one connection is read from the buffer means, the readable timing management means thereupon calculating the time to read the next cell corresponding to the connection in question from the buffer means at predetermined cell read intervals regarding the connection if the buffer means has no other cell than the read cell corresponding to the connection, the readable timing management means further accommodating temporarily the calculated timing corresponding to the connection; and scheduling management means (scheduling management table 901 in FIG. 9) acting when the cell corresponding to the connection is read from the buffer means, the scheduling management means thereupon scheduling the time to read the next cell corresponding to the connection from the buffer means at predetermined cell read intervals regarding the connection if the buffer means has other cells than the read cell corresponding to the connection, the scheduling management means further acting when the buffer means temporarily accommodates a new user data cell corresponding to a connection for which no other cell was found in the buffer means, the scheduling management means thereupon scheduling the time to read the next cell corresponding to the connection from the buffer means on the basis of the timing temporarily accommodated by the readable timing management means, the scheduling management means further determining according to a predetermined rule the connection for which the cell is to be read from the buffer means at each scheduled time for a cell read.

In another variation of the invention, the scheduling management means may determine, in the order in which the plurality of connections were recorded with the scheduling management means, the connection for which a cell is to be read from the buffer means at each scheduled time for a cell read.

In a further variation of the invention, the scheduling management means may determine, using a cyclic pointer pointing to one of the plurality of connections, the connection for which a cell is to be read from the buffer means at each scheduled time for a cell read.

In an even further variation of the invention, the scheduling management means may determine, in accordance with a priority (e.g., quality class) set for each of the plurality of connections, the connection for which a cell is to be read from the buffer means at each scheduled time for a cell read.

In a still further variation of the invention, the scheduling management means may read from the buffer means a cell corresponding to each of a plurality of connections for which a cell may be read from the buffer means at each scheduled time for a cell read, the cell read being performed at a time when there is available a bandwidth free of cells and assigned to a service to which the connection in question belongs, as well as at a time when there is available a bandwidth free of cells and assigned to a service other than that service.

In the cell scheduling apparatus according to the second aspect of the invention as outlined above, dynamic shaping is carried out not when a cell is written to the buffer means but when a cell is read therefrom. In this system, the cell scheduling apparatus readily permits dynamic shaping by simply determining the time to read the next cell from the buffer means while cells are being retained therein.

According to a third aspect of the invention, there is provided a cell scheduling apparatus for use with a cell exchange allowing fixed-length cells to switch autonomously according to routing information attached to the cells, the cell scheduling apparatus being located at an appropriate point inside the cell exchange to control rates of the cells passing through the cell exchange. The cell scheduling apparatus comprises: buffer means (common buffers 406 and 425 in FIG. 4) for temporarily accommodating input cells for each of a plurality of connections; and scheduling management means (scheduling management table 1001 and chain table 1002 in FIG. 10) acting when a cell corresponding to any one connection is read from the buffer means, the scheduling management means thereupon scheduling the time to read the next cell corresponding to the connection in question from the buffer means at predetermined cell read intervals regarding the connection, the scheduling management means further storing identification information about the connection as list data corresponding to the scheduled time for a cell read, the scheduling management means further determining the connection for which a cell is to be read from the buffer means at each scheduled time for a cell read and in accordance with the list data stored corresponding to the scheduled time for the cell read.

In the cell scheduling apparatus according to the third aspect of the invention as outlined above, the scheduling management means can be reduced significantly in scale.

According to a fourth aspect of the invention of a preferred structure of the cell scheduling apparatus according to the second or the third aspect of the invention, either the buffer means and scheduling management means; or the buffer means, scheduling management means and readable timing management means, may be provided for each of quality classes determined on the basis of quality class information attached to user data cells. The cell scheduling apparatus may further comprise quality scheduler means for selecting and outputting, in accordance with a priority of each of the quality classes, cells read by the scheduling management means from the buffer means with respect to each of the quality classes.

In the above preferred setup, the cell scheduling apparatus permits dynamic shaping of connections in an accurate manner with respect to each of the quality classes involved.

BRIEF DESCRIPTION OF THE DRAWINGS

Other objects and further features of the invention will be apparent from the following detailed description when read in conjunction with the accompanying drawings wherein:

FIG. 6 is a view of an RM cell data format;

DESCRIPTION OF THE PREFERRED EMBODIMENTS

Preferred embodiments of the invention will now be described with reference to the accompanying drawings.

<Basic Constitution and Workings of one Preferred Embodiment of the Invention>

Figure 3:
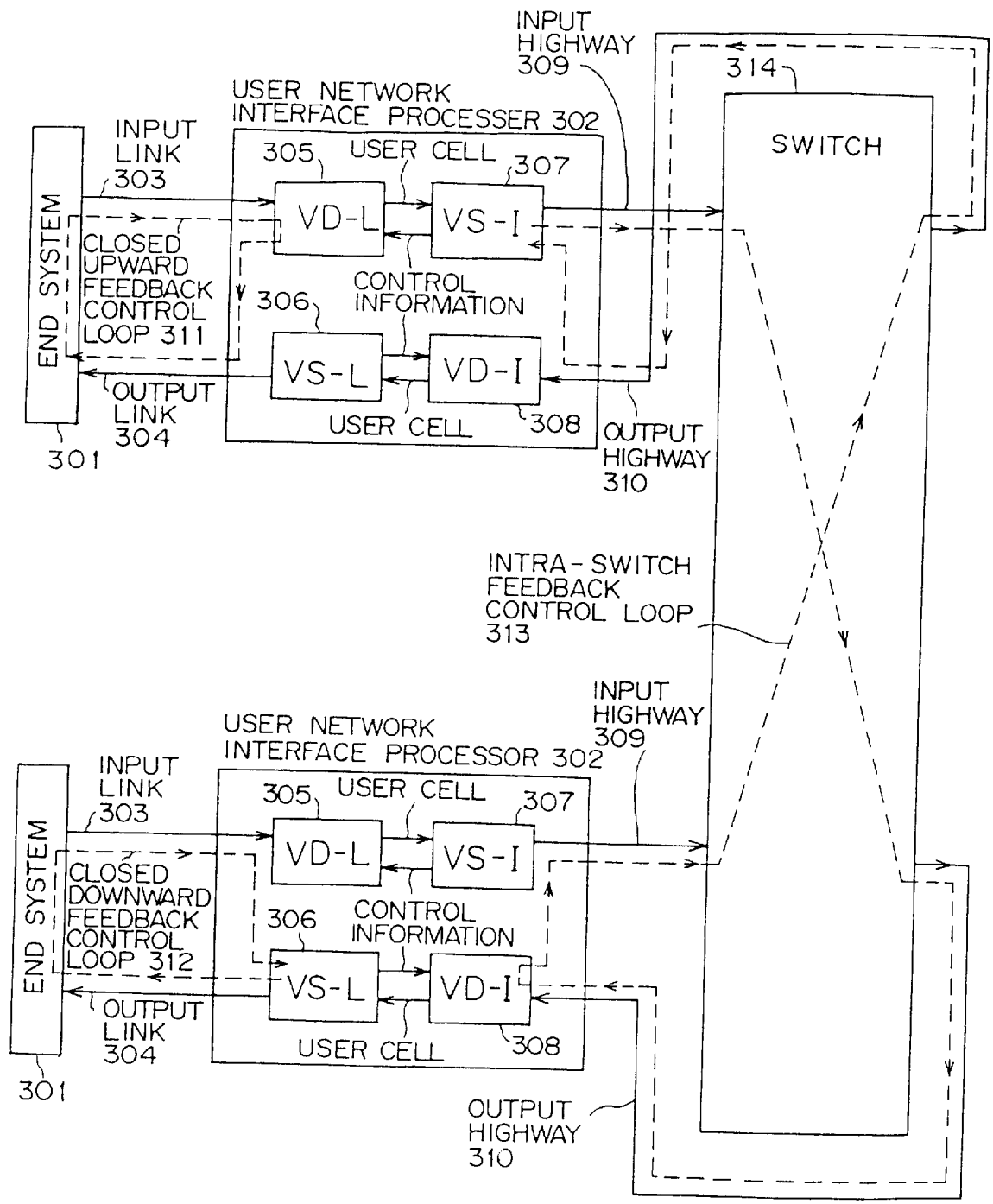
FIG. 3 is a block diagram of a preferred embodiment of the invention.

In FIG. 3, end systems 301 are installed at user locations, and user network interface processors 302 and a switch 314 are installed in an ATM exchange. Although not shown in FIG. 3, there may be provided between the user network interface processors 302 and the switch 314 a multiplexer for multiplexing a plurality of user network interface processors 302 and a demultiplexer for demultiplexing such processors. Although not shown, there may also be provided in the ATM exchange a network-network interface processor that terminates a network-network interface for interconnecting a plurality of ATM exchanges.

The end systems 301 implement functions for transmitting and receiving user data cells under the ABR service, controlling the ABR service, and transmitting and receiving RM cells in particular.

Each user network interface processor 302 terminates a low-speed line (input link 303 and output link 304) connected with the corresponding terminal 301. Besides implementing the VS/VD functions for the ABR service related to this invention, the user network interface processor 302 controls cell inflow (called usage parameter control or UPC) from the end system 301 and carries out an accounting process.

The switch 314 is constituted by self-routing modules (SRM) connected in a plurality of stages. These modules are used to switch ATM cells from a plurality of high-speed input highways 309 over to a plurality of high-speed output highways 310.

Each user network interface processor 302 includes four ABR control function units: a VD-L (virtual destination-link) unit 305, a VS-L (virtual source-link) unit 306, a VS-I (virtual source-internal) unit 307 and a VD-I (virtual destination-internal) unit 308.

The VD-L unit 305 receives an input link 303 which is connected with an end system 301. Cells leaving the end system 301 are transmitted over the input link 303.

It may happen that the end system 301 connected with the input link 303 accommodated by the VD-L unit 305 is a source end system (identified as 301(A) hereafter) for a single ABR connection (VC connection determined by a virtual channel VC). In that setup, the VD-L unit 305 terminates and loops back a forward RM cell (called F-RM cell hereafter) output by the end system 301 onto the input link 303 for the ABR connection. The looped-back cell is placed onto the output link 304 to be returned as a backward RM cell (called B-RM cell hereafter) to the source end system 301(A).

In the manner described, a closed upward feedback control loop 311 is formed for each ABR connection between the source end system 301(A) and the user network interface processor 302. User data cells of various services output by the end system 301 onto the input link 303 are transferred to the VS-I unit 307.

Figure 1:
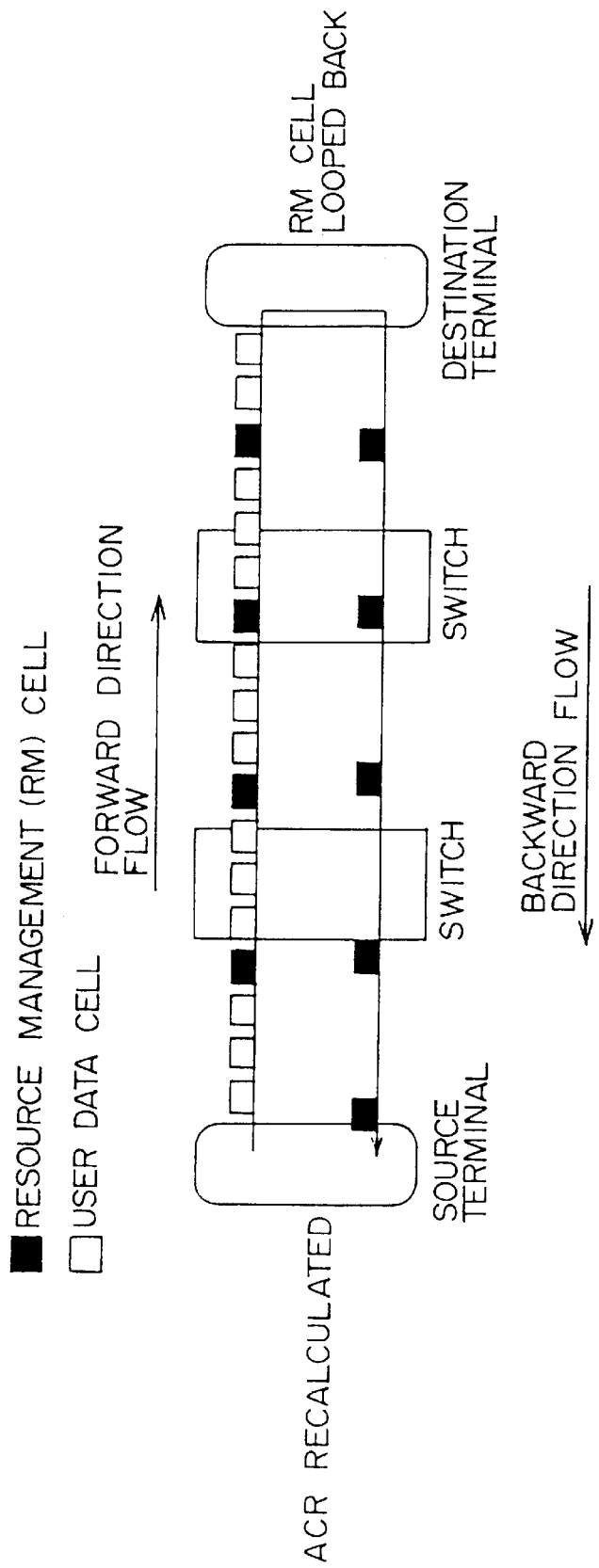
FIG. 1 is a conceptual view of ABR (available bit rate) flow control.
Figure 2:
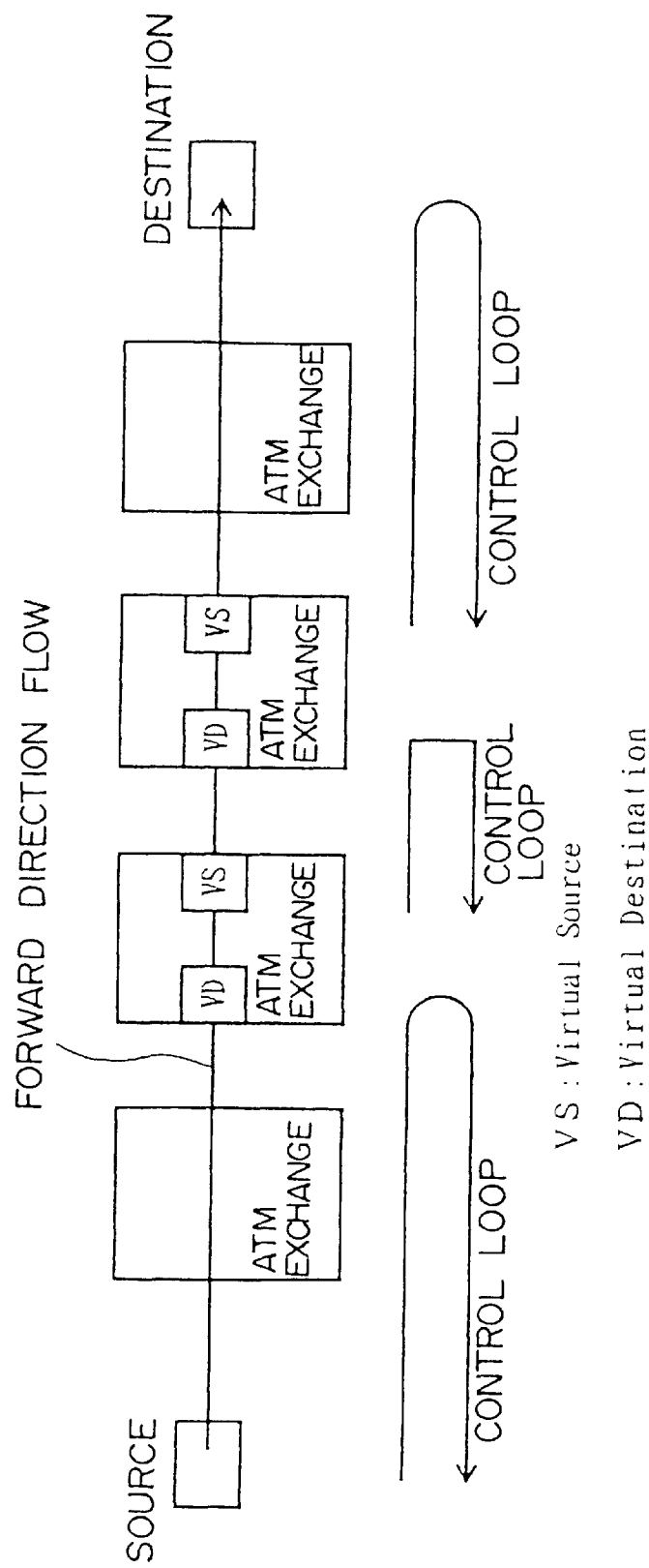
FIG. 2 is a conceptual view of the conventional VS/VD (virtual source/virtual destination) method.

The functions of the VD-L unit 305 described so far are equivalent to the VD functions implemented by the conventional system of FIG. 2.

The VS-L unit 306 receives the output link 304 connected with the end system 301. Cells to be received by the end system 301 are transmitted over the output link 304.

It may happen that the end system 301 connected with the output link 304 accommodated by the VS-L unit 306 is a destination end system (identified as 301(B) hereafter) for a given ABR connection. In that case, the VS-L unit 306 outputs an F-RM cell for the ABR connection onto the output link 304 in the direction of the destination end system 301(B). A call processor, not shown, which controls the entire operation of the ATM exchange, executes suitable software to control the interval between F-RM cells and various ABR parameters to be set in each F-RM cell.

In addition, the VS-L unit 306 terminates that B-RM cell for the ABR connection which is looped back by the destination end system 301(B) and transmitted over the input link 303.

Another function of the VS-L unit 306 is to calculate an allowed cell rate (ACR) based on information set in the B-RM cell corresponding to each of ABR connections. At the calculated rate, the VS-L unit 306 outputs onto the output link 304 the user data cells which correspond to the ABR connection in question and which have been transmitted from the switch 314 via the VD-I unit 308. The user data cells are destined for the end system 301.

As described, a closed downward feedback control loop 312 is formed for each ABR connection between the destination end system 301(B) and the user network interface processor 302. At the same time, the transfer rate for the user data cells corresponding to each ABR connection is controlled.

The functions of the VS-L unit 306 described so far are equivalent to the VS functions implemented by the conventional system of FIG. 2.

In the above embodiment, the user network interface processors 302 each include a new VS function unit (called the VS-I unit 307 hereafter) and a new VD function unit (called the VD-I unit 308 hereafter). The VS-I unit 307 generates a new F-RM cell for each ABR connection and outputs the cell onto the input highway 309 destined for the switch 314. The VD-I unit 308, located upstream of the conventional VS function block in FIG. 2, terminates and loops back for each ABR connection a new F-RM cell output by the switch 314 onto the output highway 310. The looped-back F-RM cell is placed onto the input highway 309 destined for the switch 314, the cell being returned as a B-RM cell to the VS-I unit 307. In the ATM exchange, a closed control loop for each ABR connection is formed between the VS-I unit 307 and the VD-I unit 308 via the switch 314 (the loop is called the intra-switch feedback control loop 313 hereafter). This is a major feature that characterizes this invention.

To implement the intra-switch feedback control loop 313, the call processor (not shown) for controlling the overall operation of the ATM exchange executes suitable software to determine such parameters as an interval for F-RM cell generation, a peak cell rate PCR, a minimum cell rate MCR and an initial cell rate ICR whenever a call is made for an ABR connection.

The initial cell rate ICR may be determined dynamically for each call depending on the available bandwidth BW and in accordance with the following formula:

$$ICR = BW \times \alpha$$

where, $\alpha$ stands for a coefficient greater than 0 and less than 1.

The VS-I unit 307 generates a new F-RM cell for each ABR connection and outputs the cell onto the input highway 309 destined for the switch 314. F-RM cells for a given ABR connection are generated at intervals determined when the call for that connection was made. As its current cell rate CCR, each F-RM cell carries with it the initial cell rate ICR determined when the call was made for the ABR connection in question. Also set in the F-RM cell is the minimum cell rate MCR determined when the call was made for the corresponding ABR connection (see the subsequent description in connection with FIG. 6).

For each ABR connection, the VS-L unit 306 terminates B-RM cells looped back by the VD-I unit 308 in the downstream user network interface processor 302 (or a network-network interface processor, to be described later) and transmitted over the output highway 310.

For each ABR connection, the VS-I unit 307 changes the current cell rate CCR of the F-RM cell to be output next corresponding to the ABR connection and on the basis of the explicit rate ER set in the B-RM cell.

Furthermore, the VS-I unit 307 receives for each ABR connection user data cells from the VD-L unit 305 as per the explicit rate ER and forwards the cells on to the input highway 309 while performing dynamic shaping to control the cell output rate.

The VD-I unit 308 then terminates for each ABR connection F-RM cells output by the switch 314 and loops them back onto the output highway 310 terminated by the user network interface processor 302 comprising the VD-I unit 308. The looped-back cells are placed onto the input highway 309 terminated by the corresponding user network interface processor 302, the cells being returned as B-RM cells to the VS-I unit 307.

User data cells of various services output by the end system 301 onto the input link 303 are transferred to the VS-L unit 306 without intervention of the VD-I unit 308.

In the manner described, a closed intra-switch feedback control loop 313 is formed for each ABR connection between the VS-I unit 307 and the VD-I unit 308 via the switch 314 inside the ATM exchange. This arrangement eliminates the need for installing dedicated control lines or dedicated processors for each of the ABR connections in the ATM exchange. Simply using highways (input highway 309 and output highway 310) for user data cell transmission makes it possible to implement the VS/VD functions in the category of (3), "Functions for control between the VS and the VD within the same exchange" outlined in the earlier overview of the related art.

One or both of the user network interface processors 302 in FIG. 3 may be replaced by an network-network interface processor that terminates a network-network interface connected with another ATM exchange. Such a network-network interface processor may include the VD-L unit 305, VS-L unit 306, VS-I unit 307 and VD-I unit 308. In such a case, the upstream VD-L unit 305 (close to the source end system) may form for each ABR connection a closed upward feedback control loop 311 with the VS-L unit 306 in the network-network interface processor provided in an ATM exchange located further upstream. The downstream VS-L unit 306 (close to the destination end system) may form for each ABR connection a closed downward feedback control loop 312 with the VD-L unit 305 in the network-network interface processor furnished in an ATM exchange located further downstream.

<Detailed Constitution and Workings of the User Network Interface Processor 302 (or Network-Network Interface Processor)>

Figure 4:
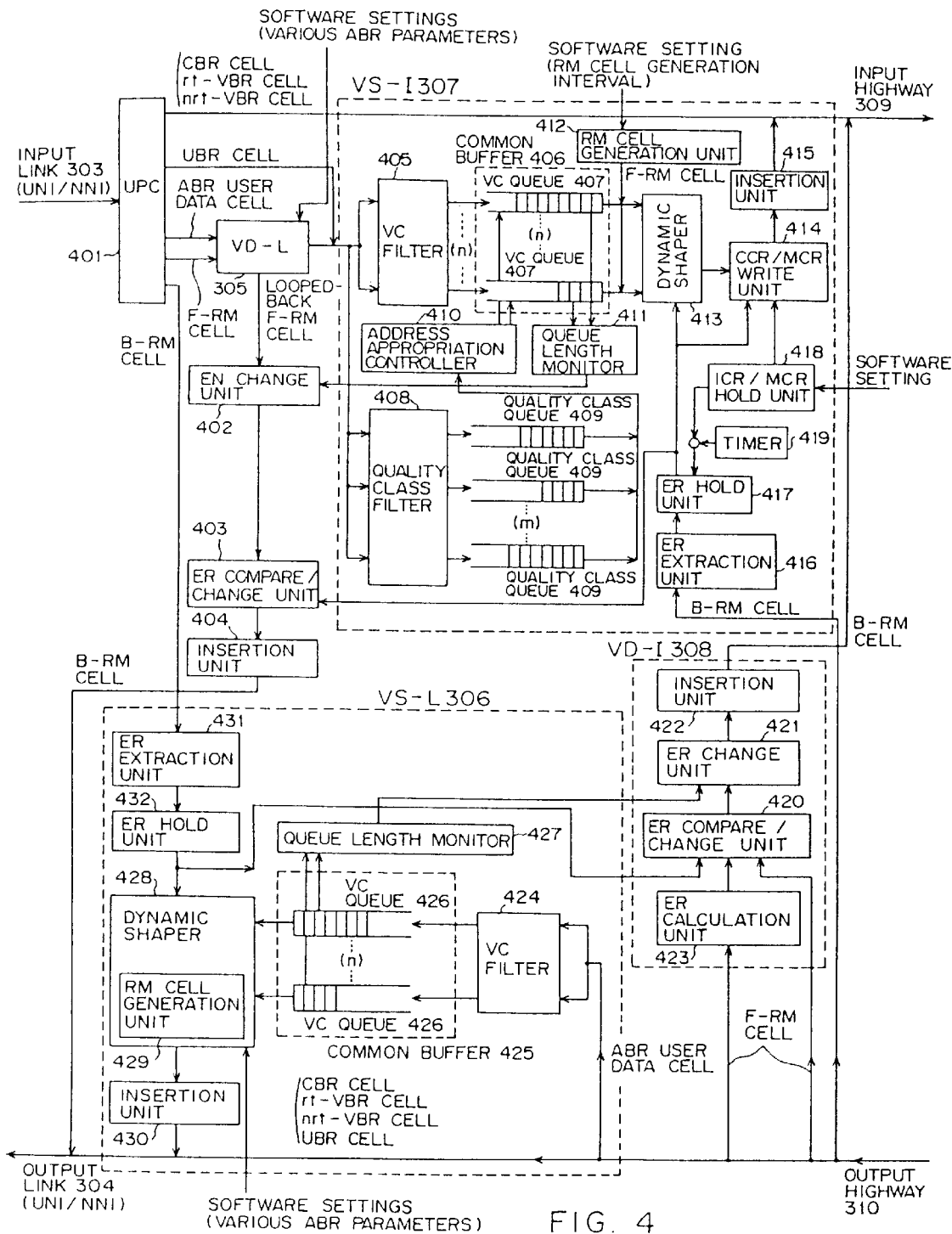
FIG. 4 is a block diagram of a user network interface processor 302 included in FIG. 3.

FIG. 4 is a detailed block diagram of the user network interface processor 302 (or the above-mentioned network-network interface processor) included in FIG. 3. Major components of the processor 302 are described below.

UPC 401

Cells input over the input link 303, which is either a user network interface (UNI) or a network-network interface (NNI), first arrive at a usage parameter controller (UPC) 401 to undergo usage parameter control. The UPC 401 admits cells of services having various service quality classes defined by ATM Forum TM (Traffic Management) 4.0. These services include CBR, rt-VBR, nrt-VBR and UBR.

The CBR (constant bit rate) service is a service that guarantees a constant bit rate for real-time voice transmission and the like.

The VBR (variable bit rate) service is defined by three parameters: peak cell rate PCR, sustainable cell rate SCR, and maximum burst size MBS. The service applies to burst-type data communications in which which the bit rate keeps changing, such as MPEG 2. The UPC 401 checks to see if such communications meet the conditions stipulated by the parameters involved. In addition, the UPC 401 controls cell output in accordance with the GCRA (generic cell rate algorithm) intended to control cell outflow based on these parameters. Unlike the ABR service associated with this invention, the VBR service keeps the rate of any one connection unaffected by the traffic status of the other connections.

Of VBR service variations, what is known as rt (real time)-VBR applies to data communications requiring the guarantee of their real-time nature, such as MPEG 2. A VBR service variation applied to data communications not requiring the real-time guarantee is called nrt (non-real-time)-VBR.

The UBR (unspecified bit rate) service neither imposes constraints on bit rates for data communications nor guarantees anything about the rates. End systems may transmit cells at any desired rate; these cells run a higher risk of being discarded in the network and are without guarantee. The UBR service applies to data communications for which the peak cell rate cannot be defined. The transfers of cells between end systems are guaranteed by a higher layer protocol such as the TCP/IP that utilizes the UBR service.

Of the cells output by the UPC 401 in FIG. 4, those of the CBR, rt-VBR and nrt-VBR services are placed onto the input highway 309 destined for the switch 314 (FIG. 3) without intervention of the VD-L unit 305 and VS-I unit 307.

The cells of the UBR service output by the UPC 401 are input to the VS-I unit 307 without intervention of the VD-L unit 305. In large-scale ATM exchanges, UBR service cells are apt to develop buffer overflow. That eventuality is minimized by submitting the cells to cell buffering control by the VS-I unit 307, to be described later.

Cells of the CBR, rt-VBR and nrt-VBR services may also be input to the VS-I unit 307 for processing as needed.

VD-L Unit 305

User data cells of the ABR service output by the UPC 401 are transferred to the VS-I unit 307 through the VD-L unit 305. Whether or not the VD-L unit 305 controls the user data cells in any way is subject to ATM Forum recommendations and will not be specified for this embodiment. Various parameters for the ABR service (not shown), to be set to the VD-L unit 305, are established by appropriate software run by the call processor (not shown) controlling the overall workings of the ATM exchange.

An F-RM cell output by the UPC 401 is terminated and looped back by the VD-L unit 305. The value of the explicit rate ER in the looped-back F-RM cell is changed by an ER change unit 402 and an ER compare/change unit 403 for each ABR connection in accordance with the queue length of user data cells in a common buffer 406 inside the VS-I unit 307 and on the basis of the explicit rate ER fed back by the intra-switch feedback control loop 313 (FIG. 3). With the ER value changed, the F-RM cell is output as a B-RM cell by an insertion unit 404 onto the output link 304 which is either a user network interface (UNI) or a network-network interface (NNI). The insertion unit 404 outputs B-RM cells when the output link 304 is free of cells.

In this manner, a closed upward feedback control loop 311 is formed for each ABR connection between the source end system 301(A) and the user network interface processor 302, or between the network-network interface processor in an upstream ATM exchange on the one hand, and the network-network interface processor in this ATM exchange on the other hand.

In the case above, the explicit rate ER which was extracted by an ER extraction unit 416 from the B-RM cell terminated by the downstream VS-I unit 307 and was held in an ER hold unit 417 is fed back by the ER compare/change unit 403 to the RM cell looped back by the VD-L unit 305 in the user network interface processor 302 (or network-network interface processor) comprising the VS-I unit 307. This is another feature that characterizes this invention. The feature implements the function (a), "Transfer of the ER value in an RM cell terminated by the VS inside an exchange, on to the upstream VD within the same exchange," under the category (3), "Functions for control between the VS and the VD within the same exchange" outlined in the earlier overview of the related art. The above function is implemented only by the intra-switch feedback control loop 313 formed between the upstream VS-I unit 307 and the downstream VD-I unit 308 inside the ATM exchange.

The queue length of user data cells in the common buffer 406 inside the VS-I unit 307 is fed back by the ER change unit 402 to the RM cell which is looped back by the VD-L unit 305 in the user network interface processor 302 (or network-network interface processor) incorporating the VS-I unit 307. This allows the traffic handling status of the user network interface processor 302 (or network-network interface processor) to be fed back precisely to the closed upward feedback control loop 311 on the upstream side. This is another feature that characterizes the present invention.

Although the ER change unit 402, ER compare/change unit 403 and insertion unit 404 are functionally included in the VD-L unit 305, they are shown separately from the VD-L unit 305 to clarify that which characterizes the invention.

Cell Formats

Figure 5:
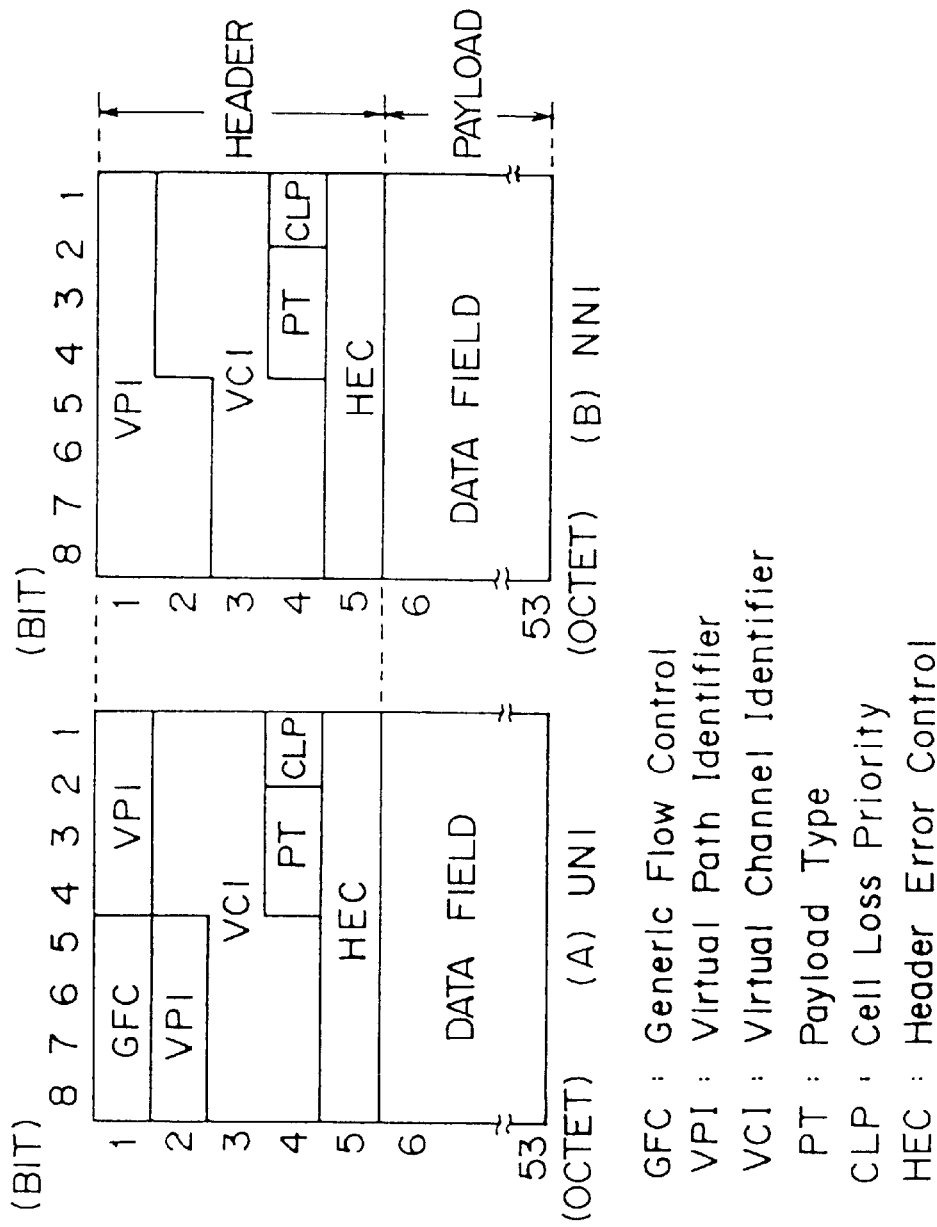
FIGS. 5(A) and 5(B) are views of cell data formats.

FIGS. 5(A) and 5(B) are views of generic cell data formats. FIG. 5 (A) shows a data format in effect when the input link 303 is a user network interface. FIG. 5(B) indicates a data format in effect when the input link 303 is a network-network interface.

As illustrated in FIGS. 5(A) and 5(B), a cell is composed of a header and a payload. Communication data (user data or various kinds of control data) is stored in a data field constituting the payload.

In the header, a generic flow control (GFC) field is used to control cell confliction in a LAN (local area network) and the like.

A virtual path identifier (VPI) provides address information for identifying a virtual path (VP) of the cell. A virtual channel identifier (VCI) is address information for identifying a virtual channel (VC) of the cell. In a cell under the ABR service, the VC field identifies an ABR connection.

A cell loss priority (CLP) field is used to control the priority of the cell to be transmitted. Specifically, a cell in which CLP=1 is more likely to be discarded in the network than a cell in which CLP=0.

A header error control (HEC) field is an error check field that detects and corrects data error in the header of the cell.

A payload type (PT) field is specific to this invention and intended to hold cell type information and an EFCI bit. The PT field is three bits long. In a user data cell, the PT field has 0 set in bit 4 of the 8 bit line (leftmost bit). Also in the user data cell, bit 5 of the PT field (i.e., center bit) functions as an EFCI bit. When set to 0, the EFCI bit indicates that there is no congestion on the path for the user data cell in question. When set to 1, the EFCI bit indicates occurrence of congestion over the path for the user data cell. In the switch 314, a value 1 indicating congestion, is set to the EFCI bit in each user data cell passing through a point where congestion has occurred. In the RM cell, the PT field has three-bit data "110" set therein.

In the switch 314, each cell is prefixed with an overhead of several octets accommodating a self-routing tag and other data, and the values in the VPI and VCI fields are converted. However, the three-bit data in the payload type field (PT) is transmitted unchanged.

FIG. 6 is a view of an RM cell data format. In the RM cell, the payload type field (PT; see FIG. 5) in the header is set with three-bit data "110." When the RM cell is a cell under the ABR service, the VCI field in the header is set with 6.

In the payload, a value 1 representing the ABR service is set as RM protocol ID in octet 6. Octet 7 in the RM cell is called a message type field in which the following bit information is set: DIR: direction bit, set to 0 for the forward direction and to 1 for the backward direction. BN: BECN RM cell indication bit, set to 1 when the switch 314 or the destination end system 301(B) generates a B-RM cell. The BECN RM cell indication bit distinguishes this B-RM cell from a B-RM cell generated by the source end system 301(A) and looped back by the destination end system 301(B).

CI: Congestion indication bit, set to 1 to indicate congestion and to 0 to indicate no congestion. When the CI bit is set to 1, a decrease in the allowed cell rate (ACR) for the source end system 301(A) is requested.

NI: No-increase bit, set so as to prevent the allowed cell rate ACR from being increased for the source end system 301(A). Unlike the CI bit, the NI bit does not request any decrease in the allowed cell rate. Generally the source end system 301(A) outputs an F-RM cell in which the NI bit is set to 0.

RA: Request/acknowledge bit, not for use with the ABR service defined by the ATM Forum.

In the RM cell, an explicit rate ER is set in octets 8 and 9, the current cell rate CCR is set in octets 10 and 11, and the minimum cell rate MCR is set in octets 12 and 13. These fields are of particular interest to this invention.

In the RM cell, a QL field in octets 14 through 17 and an SN field in octets 18 through 21 are not for use with the ABR service stipulated by the ATM Forum.

A first and a second bit in octet 52 and a CRC-10 field in octet 53 in the RM cell are cyclic redundancy check codes for error detection and correction.

Bits 1 through 3 in octet 7, octets 22 through 51, and bits 3 through 8 in octet 52 in the RM cell are reserved fields.

Figure 7:
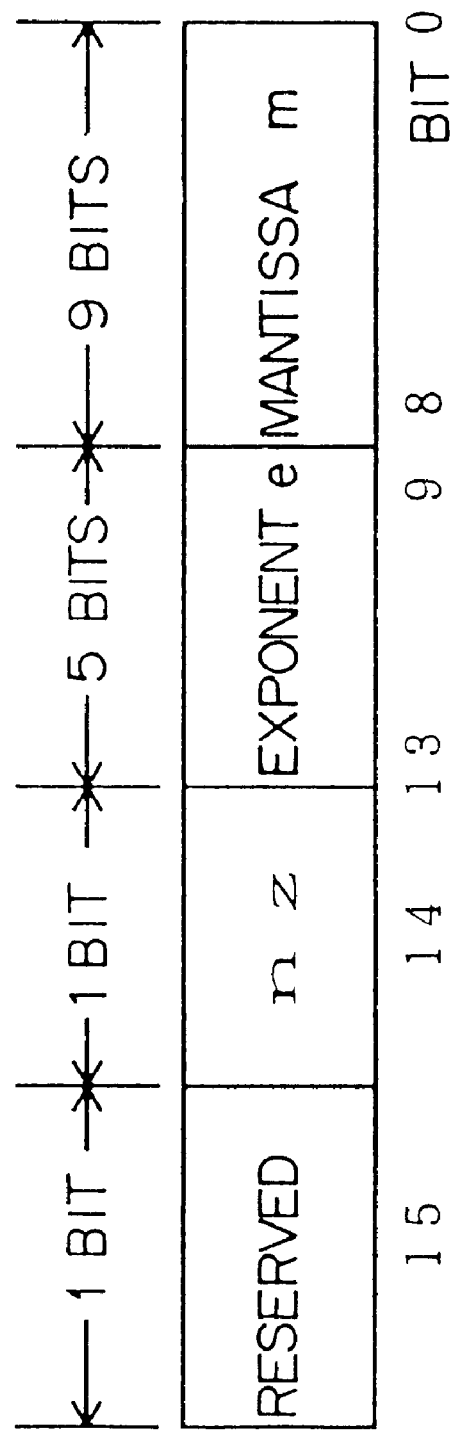
FIG. 7 is a view of a rate indication format.

FIG. 7 is a view of a rate indication format indicating an explicit rate ER, a current cell rate CCR or a minimum cell rate MCR. Any one of these rates is set in the RM cell.

The rate is indicated in a format comprising a five-bit exponent (e), a nine-bit mantissa (m) and a binary floating-point made of a single bit (nz bit). The rate R may be calculated by use of the formula:

$$R = \{2^e(1+m/512)\} \times nz \text{ [cells/second]}$$

If the nz bit is 0, the rate is 0; if the nz bit is 1, the rate is determined by the exponent (e) and mantissa (m). The two parameters must fall into the ranges of:

$0 \leq e \leq 31$ and $0 \leq m \leq 511$

VS-L Unit 306

An RM cell generation unit 429 in a dynamic shaper 428 inside the VS-L unit 306 in FIG. 4 outputs for each ABR connection an F-RM cell onto the output link 304 via an insertion unit 430 with respect to each virtual channel identifier (see FIG. 5) corresponding to the ABR connection. The insertion unit 430 outputs the F-RM cell when the output link 304 is free of cells. The interval for F-RM cell generation and various ABR parameters to be set in the F-RM cell are established by appropriate software run by the call processor (not shown) controlling the overall workings of the ATM exchange.

The ER extraction unit 431 in the VS-L unit 306 terminates and extracts for each ABR connection a B-RM cell which was looped back by the upstream destination end system 301(B) or the VD-L unit 305 in an upstream ATM exchange and transmitted over the input link 303. The extracted B-RM cell is held in the ER hold unit 432 for each VCI corresponding to the ABR connection.

The VS-L unit 306 calculates the allowed cell rate ACR based on information set in the B-RM cell corresponding to the VCI representing each ABR connection. At the calculated rate, the VS-L unit 306 outputs user data cells onto the output link 304 destined for the end system 301, the user data cells corresponding to the ABR connection and having been transferred from the switch 314 over the output highway 310. This function is implemented by the VC filter 424, by the common buffer 425 including VC queues 426 and by the dynamic shaper 428. The operations of these components are omitted here because they are the same as those of the VC filter 405, the common buffer 406 including VC queues 407, the dynamic shaper 413, a CCR/MCR write unit 414 and an ICR/MCR hold unit 418 in the VS-I unit 307, to be described later. The functions equivalent to the CCR/MCR write unit 414 and ICR/MCR hold unit 418 are included in the dynamic shaper 428.

In the manner described, a closed downward feedback control loop 312 is formed for each ABR connection between the destination end system 301(B) and the user network interface processor 302, or between the network-network interface processor in a downstream ATM exchange on the one hand, and the network-network interface processor in this ATM exchange on the other hand. At the same time, the transmission rate of user data cells for each ABR connection is controlled.

VS-I Unit 307

In the VS-I unit 307 shown in FIG. 4, the VC (virtual channel) filter 405 writes an ABR service user data cell from the VD-L unit 305 or a UBR service user data cell from the UPC 401 to a free buffer memory address, not shown, inside the common buffer 406. The VC filter 405 then writes the address to the tail of the VC (virtual channel) queue 407 corresponding to the virtual channel identifier VCI (see FIG. 5) attached to the header of the user data cell in question. The VC queues 407 illustratively constitute a first-in first-out (FIFO) address buffer. Thus user data cells are buffered in the common buffer 406 after being classified by the connection defined by the VCI.

In the above setup, the common buffer 406 incorporates sufficient VC queues 407 to accommodate all VCI's that are predicted to occur.

Figure 8:
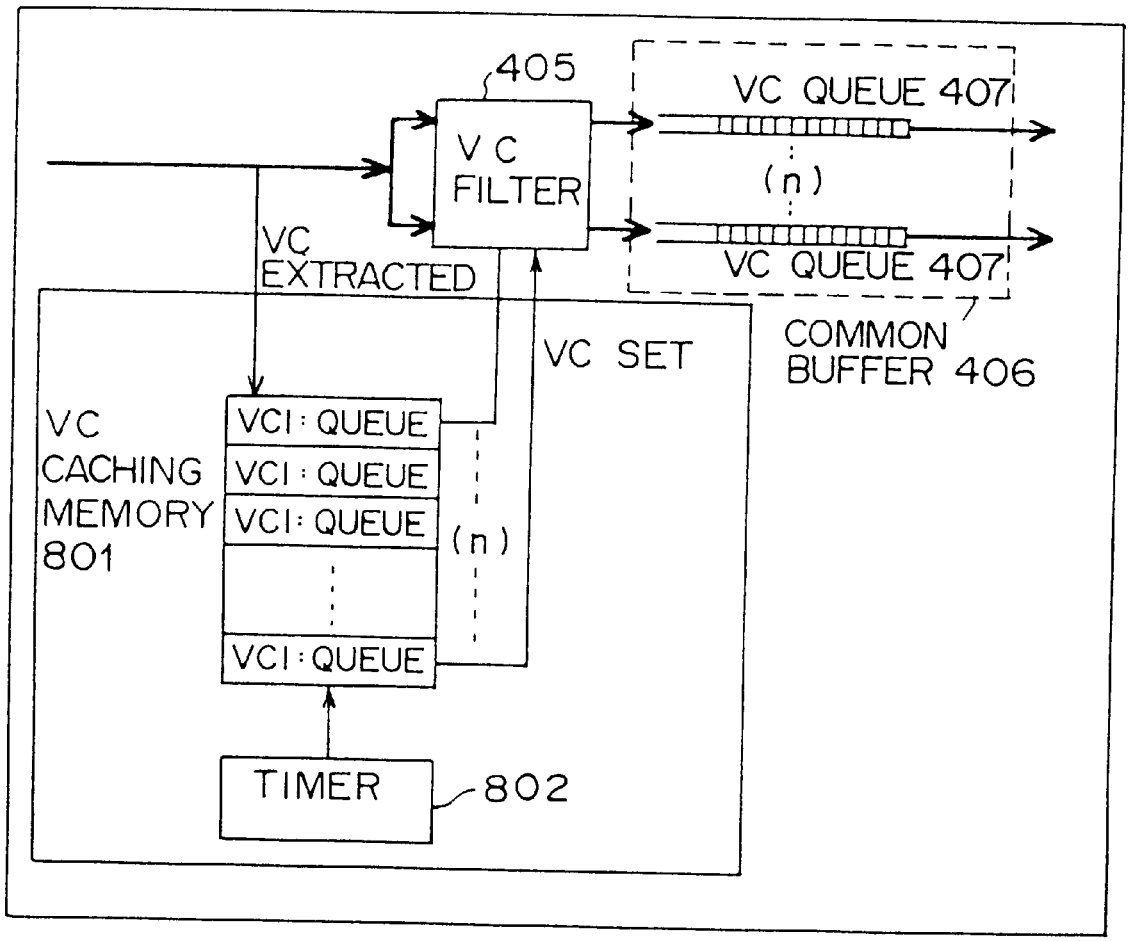
FIG. 8 is a block diagram outlining how a VC filter 405 is controlled by use of a VC caching memory 801.

Another setup as shown in FIG. 8 may also be envisaged. In this setup, the common buffer 406 has fewer VC queues 407 than the total number of VCI's that are predicted to occur. Then consider the arrival of a user data cell with a VCI identifying a connection for which any VC queue 407 has yet to be allocated. In that case, the VC filter 405 appropriates a single free VC queue 407 from the common buffer 406, and writes the VCI in question paired with the appropriated VC queue 407 to the tail of the VC caching memory 801.

It may happen that all free VC queues 407 have been exhausted in the common buffer 406 upon arrival of a user data cell with a VCI identifying a connection for which any VC queue 407 has yet to be allocated. In that case, the VC filter 405 substitutes the newly received VCI for the most recently written VCI set in the VC caching memory 801 and paired with the corresponding VC queue 407.

Alternatively, the VC filter 405 may substitute the newly received VCI for the oldest VCI written in the VC caching memory 801 in combination with the VC queue 407.

It may also happen that all free VC queues 407 have been exhausted in the common buffer 406 upon arrival of a user data cell having a VCI indicating a connection for which any VC queue 407 has yet to be allocated and for which the minimum cell rate MCR is set to 0. In that case, the VC filter 405 substitutes the newly received VCI for a VCI associated with a connection in which the minimum cell rate MCR is set to 0, from among the VCI's paired with VC queues 407 and recorded in the VC caching memory 801.

A timer 802 monitors, for each pair of a VC queue 407 and a VCI written in the VC caching memory 801, whether the user data cell corresponding to the VCI in question has newly arrived at VS-I unit 307 from VD-L unit 305 in a predetermined time. If the corresponding user data cell has failed to arrive in the predetermined time, the timer 802 deletes from the VC caching memory 801 the VCI in question paired with the corresponding VC queue 407.

With the above constitution in place, there is no need to provide the common buffer 406 internally with sufficient VC queues 407 to accommodate all VCI's that are predicted to occur. The common buffer 406 is thus reduced in scale. The number of VC queues 407 inside the common buffer 406 corresponds to the number of connections processed by the dynamic shaper 413, to be described later. For this reason, the dynamic shape 413 may also be reduced in scale.

A quality class filter 408 identifies the VCI and quality class information found in each of ABR service user data cells from the VD-L unit 305 or UBR service user data cells from the UPC 401. Thereafter, a VCI belonging to each quality class is written to the tail of a quality class queue 409 corresponding to each quality class. The quality class queues 409 are furnished inside the common buffer 406 or other suitable storage means and illustratively constitute a last-in first-out (LIFO) buffer.

At present, there is a demand for dividing the ABR service into a plurality of quality classes in addition to the service quality classification involving CBR, rt-VBR, nrt-VBR, ABR and UBR. The demand may be met by utilizing in each user data cell a specified field or tag area, not shown, for designating a quality class. According to such quality classes, priorities may be set illustratively for any of the cells to be discarded in the network.

An address appropriation controller 410 acts when, with the cell buffer memory full of cells in the common buffer 406, a new user data cell is received from the VD-L unit 305. In that case, the address appropriation controller 410 extracts one VCI from the quality class queue 409 representing the lowest of quality classes lower than the quality class set in the newly received user data cell, the extracted VCI being one for which the connection belongs to the quality class of the corresponding user data cell. The address appropriation controller 410 then appropriates illustratively the oldest address from that VC queue 407 in the common buffer 406 which corresponds to the VCI. In other words, the address appropriation controller 410 overwrites the newly received user data cell onto the appropriated cell buffer memory address, deletes the address from the VC queue 407 in which the address was retained, and writes the address to the tail of the VC queue 407 corresponding to the VCI set in the newly received user data cell.

In this manner, when the cell buffer memory is full of user data cells in the common buffer 406, cells of higher quality classes are preferentially transferred, and cells of lower quality classes are discarded.

A queue length monitor 411 notifies the ER change unit 402 of the VCI corresponding to that VC queue 407 in the common buffer 406 which exceeds a predetermined queue length. In turn, the ER change unit 402 lowers by a predetermined amount (or according to a predetermined algorithm) the explicit rate ER (see FIG. 6) of the RM cell having the same VCI as that indicated by the queue length monitor 411, the RM cell being selected from among the RM cells looped back by the VD-L unit 305. This arrangement allows the traffic handling status of the user network interface processor 302 (or network-network interface processor) to be fed back precisely to the closed upward feedback control loop 311 on the upstream side.

An RM cell generation unit 412 generates a new F-RM cell for each ABR connection and with respect to the VCI for the ABR connection in question. The generated F-RM cell is transferred to the CCR/MCR write unit 414 via the dynamic shaper 413, to be described later. The interval for RM cell generation is determined, when a call is made for each ABR connection by the call processor (not shown) executing appropriate software.

For each ABR connection, the CCR/MCR write unit 414 writes a current cell rate CCR and a minimum cell rate MCR (see FIG. 6) to an F-RM cell transmitted from the RM cell generation unit 412 via the dynamic shaper 413. This F-RM cell is output onto the input highway 309 by way of an insertion unit 415. The insertion unit 415 outputs the F-RM cell when the input highway 309 is free of cells.

The ICR/MCR hold unit 418 holds for each VCI corresponding to an ABR connection an initial cell rate ICR and a minimum cell rate MCR determined by the call processor (not shown) executing suitable software when a call is made for each ABR connection. At the beginning of communication for a given ABR connection, the ER hold unit 417 holds as an explicit rate ER the initial cell rate ICR retained in the ICR/MCR hold unit 418.

The CCR/MCR write unit 414 writes to the F-RM cell the explicit rate ER held in the ER hold unit 417 as well as the minimum cell MCR rate retained in the ICR/MCR hold unit 418.

The ER extraction unit 416 terminates and extracts for each ABR connection a B-RM cell which was looped back by the VD-I unit 308 in the downstream user network interface processor 302 (or network-network interface processor to be discussed later) and transmitted over the output highway 310. The extracted B-RM cell is held in the ER hold unit 417 in combination with the VCI corresponding to each ABR connection.

The CCR/MCR write unit 414 changes the current cell rate CCR of the F-RM cell to be output next corresponding to each ABR connection. The rate change is made for each VCI corresponding to the ABR connection and on the basis of the explicit rate ER extracted from the B-RM cell and held in the ER hold unit 417.

Figure 9:
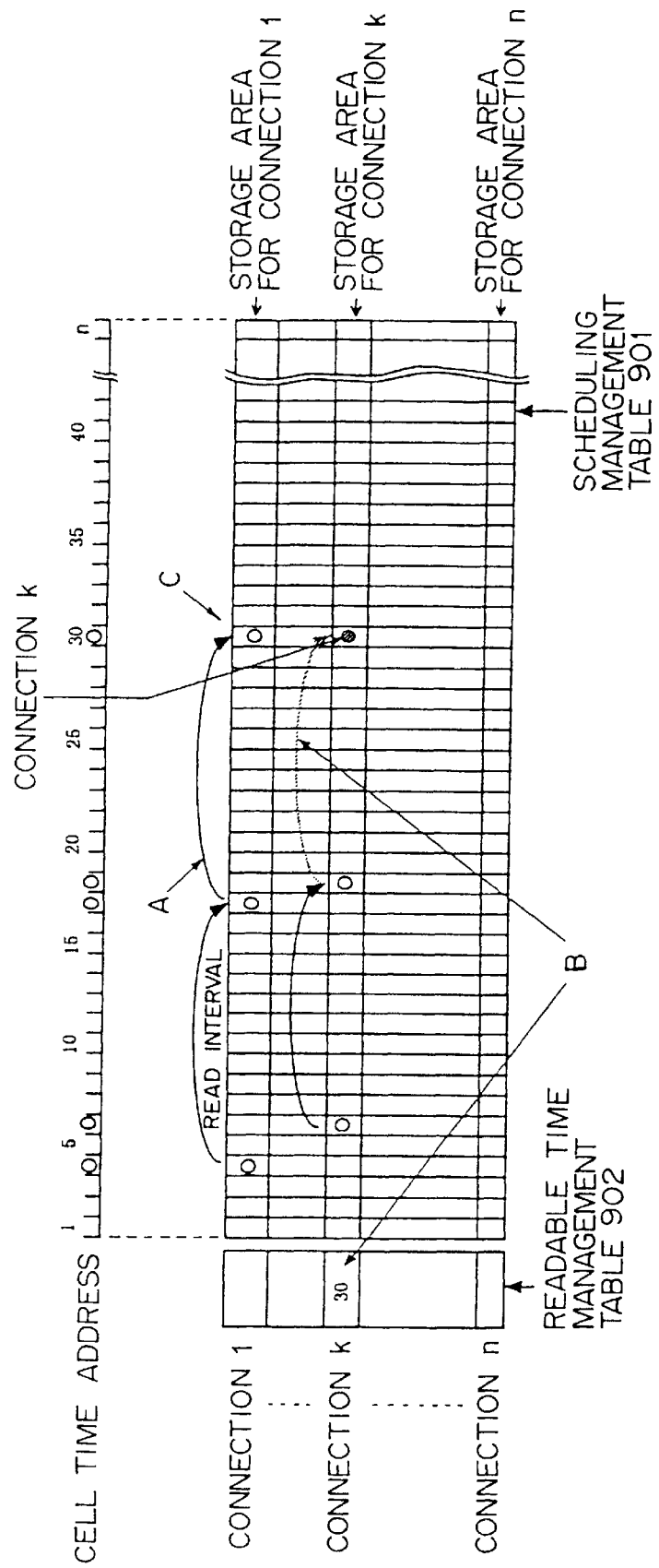
FIG. 9 is a block diagram of a dynamic shaper 413.
Figure 10:
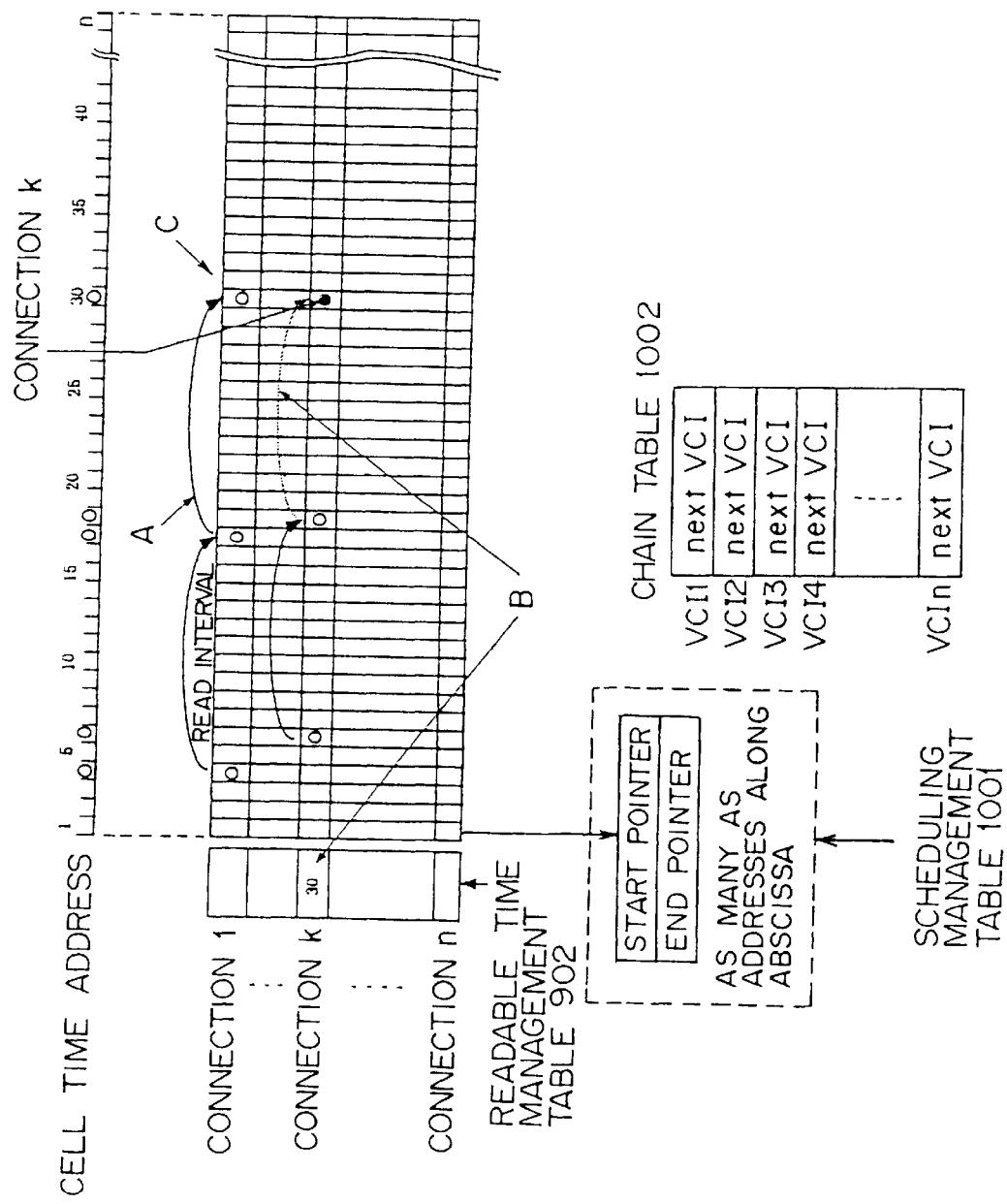
FIG. 10 is another block diagram of the dynamic shaper 413.

The dynamic shaper 413, to be described in more detail with respect to FIGS. 9 and 10, carries out dynamic shaping for each VCI corresponding to an ABR connection so as to read a user data cell from the cell buffer memory in the common buffer 406 at a time denoted by the explicit rate ER held in the ER hold unit 417. During dynamic shaping, the dynamic shaper 413 outputs the user data cell thus retrieved onto the input highway 309 via the CCR/MCR write unit 414 and insertion unit 415.

Inside the switch 314, congestion status is monitored at a plurality of congestion monitoring points (not shown) so that the explicit rate ER of the RM cell corresponding to the ABR connection having caused congestion is changed accordingly. The RM cell in question is looped back by the VD-I unit 308 in the downstream user network interface processor 302 (or network-network interface processor). The looped-back RM cell is returned as a B-RM cell to the VS-I unit 307 which generated the RM cell in the user network interface processor 302 (or network-network interface processor). In this manner, the traffic status inside the switch 314 is reflected in the explicit rate ER of the B-RM cell and fed back to the VS-I unit 307. Given the fed-back explicit rate ER, the VS-I unit 307 causes the dynamic shaper 413 to perform dynamic shaping and the CCR/MCR write unit 414 to set a current cell rate CCR to the next F-RM cell. This function is implemented only when the intra-switch feedback control loop 313 is formed between the upstream VS-I unit 307 and the downstream VD-I unit 308 in the ATM exchange.

A timer 419 monitors, for each VCI corresponding to an ABR connection, whether the user data cell corresponding to the VCI in question has newly arrived in a predetermined time at the VS-I unit 307 from the VD-L unit 305. If the corresponding user data cell has failed to arrive in the predetermined time, the timer 419 lowers to an initial cell rate ICR the explicit rate ER held in the ER hold unit 417 corresponding to the VCI, the initial cell rate having being held in the ICR/MCR hold unit 418 corresponding to the VCI in question. This arrangement permits effective utilization of bandwidths for the ABR service.

VD-I Unit 308

As discussed above, the VD-I unit 308 in FIG. 4 terminates and loops back for each ABR connection an F-RM cell which was output by the switch 314 and transmitted over the output highway 310 that is terminated by the user network interface processor 302 (or network-network interface processor) incorporating the VD-I unit 308 in question. The looped-back F-RM cell is output onto the input highway 309 that is terminated by the user network interface processor 302 (or network-network interface processor) incorporating the VD-I unit 308 in question, the F-RM cell being returned as a B-RM cell to the VS-I unit 307.

In the above case, the ER compare/change unit 420 in the VD-I unit 308 terminates for each ABR connection the F-RM cell transmitted over the output highway 310. By comparing the explicit rate ER (see FIG. 6) in the F-RM cell with the explicit rate ER held by the ER hold unit 432 in the VS-L unit 306, the ER compare/change unit 420 selects the lower rate of the two and sets the selected rate anew to the F-RM cell.

The VD-I unit 308 may be provided not in each user network interface processor 302 (or network-network interface processor) but inside a multiplexer/demultiplexer for multiplexing/demultiplexing a plurality of user network interface processors 302 (or network-network interface processors). In such a case, as shown in FIG. 4, an ER calculation unit 423 is furnished in the VD-I unit 308. The ER calculation unit 423 counts active ABR connections (virtual channel identifiers VCI) on the output highway 310 and divides the transmission rate of the output highway 310 by the active ABR connection count thus obtained. The quotient from the division gives an explicit rate ER that is a transmission rate assigned equally to each connection. When determining a new explicit rate ER for each ABR connection, the ER compare/change unit 420 may be arranged to take into consideration the explicit rate ER calculated by the ER calculation unit 423.

The F-RM cell output by the ER compare/change unit 420 is input to an ER change unit 421. In turn, the ER change unit 421 lowers by a predetermined amount (or according to a predetermined algorithm) the explicit rate ER of the F-RM cell having the same VCI as that indicated by a queue length monitor 427 in the VS-L unit 306. The queue length monitor 427 in the VS-L unit 306 has the same function as that of the queue length monitor 411 in the VS-I unit 307. Specifically, the queue length monitor 427 notifies the ER change unit 421 of the VCI corresponding to that VC queue 426 in the common buffer 425 which exceeds a predetermined queue length.

The F-RM cell output by the ER change unit 421 for each ABR connection is placed onto the input highway 309 by an insertion unit 422 as B-RM cell. The insertion unit 422 outputs the B-RM cell when the input link 303 is free of cells.

As described, what characterizes this invention is that the explicit rate ER, which is extracted by the ER extraction unit 431 from the B-RM cell terminated by the downstream VS-L unit 306 and which is held in the ER hold unit 432, is fed back by the ER compare/change unit 420 to the RM cell looped back by the VD-I unit 308 in the user network interface processor 302 (or network-network interface processor) that comprises the VS-L unit 306 in question. This feature implements the function (a), "Transfer of the ER value in an RM cell terminated by the VS inside an exchange, on to the upstream VD within the same exchange," under the category (3), "Functions for control between the VS and the VD within the same exchange" outlined in the earlier overview of the related art. The above function is implemented only by the intra-switch feedback control loop 313 formed between the upstream VS-I unit 307 and the downstream VD-I unit 308 inside the ATM exchange.

The queue length of user data cells in the common buffer 425 inside the VS-L unit 306 is fed back by the ER change unit 421 to the RM cell which is looped back by the VD-I unit 308 in the user network interface processor 302 (or network-network interface processor) incorporating the VS-L unit 306. This allows the traffic handling status of the user network interface processor 302 (or network-network interface processor) to be fed back precisely to the intra-switch feedback control loop 313 on the upstream side as well as to the closed upward feedback control loop 311. This is another feature that characterizes the present invention.

Dynamic Shaper 413

FIG. 9 is a block diagram of the dynamic shaper 413 included in FIG. 4 (one of the two shaper-related diagrams installed). The dynamic shaper 413 has two tables: a scheduling management table 901 and a readable time management table 902.

The dynamic shaper 413 controls reading of user data cells from the common buffer 406 for each VCI corresponding to an ABR connection through the use of cyclic cell read timings ranging cyclically from 1 to n, "1, 2, . . . , n-1, n, 1, 2, etc.," where n represents the number of ABR connections (virtual channels VC) that may be handled concurrently by the VS-I unit 307. Illustratively, the number n is 8,192.

For cell read control, the scheduling management table 901 has a storage area (a horizontal area in FIG. 9) having addresses 1 through n (called cell time addresses hereafter) associated with the above cell read timings 1 through n for each of the connections 1 through n (vertical positions in FIG. 9).

Take any one connection as an example. With this example, in the storage area corresponding to the connection (VCI) inside the scheduling management table 901, a flag (e.g., value "1") is set to each of cell time addresses representing the cell read timings at which the user data cells having the VCI corresponding to the connection are read from the common buffer 406. In FIG. 9, each of these flags is indicated by a small hollow circle.

At a given cell read timing, an address is read from that VC queue 407 in the common buffer 406 which corresponds to the VCI of the connection having a flag set to the cell time address corresponding to the cell read timing in question. A user data cell is read from the cell buffer memory address corresponding to the retrieved address inside the common buffer 406. The user data cell is then output onto the input highway 309 via the CCR/MCR write unit 414 and insertion unit 415 in FIG. 4.

Suppose now that a user data cell is read for a given connection from the common buffer 406. Suppose also that VC queue 407 in the common buffer 406 which corresponds to the VCI of the connection in question has the address of the user data cell to be read next. In such a case, in the storage area corresponding to the connection in the scheduling management table 901, a flag is set to the cell time address (called the next cell time address) from which the user data cell is to be read next. The next cell time address here is an address value obtained by adding a cell read interval value to the cell time address corresponding to the current cell read timing (called the current cell time address), the cell read interval value being proportional to the explicit rate ER which is held in the ER hold unit 417 in FIG. 4 and which corresponds to the connection in question. Where the next cell time address exceeds the cell time address n, a flag is set to an address looped back to the side of cell time address 1, the address being acquired as the next cell time address minus value n.

For example, as indicated by reference character A in FIG. 9, a flag is set to a cell time address "17" in that storage area of the scheduling management table 901 which corresponds to a connection 1 at a cell read timing "17." This allows user data cells to be read corresponding to the connection 1. If that VC queue 407 in the common buffer 406 which corresponds to the VCI of the connection 1 has the address from which the user data cell is to be read next, then a flag is set to the next cell time address "30" obtained by adding to the current cell time address "17" the cell read interval value "13" proportional to the explicit rate ER corresponding to the connection 1 in that storage area in the scheduling management table 901 which corresponds to the connection 1.

On the other hand, suppose that a user data cell has been read for a given connection from the common buffer 406 and that VC queue 407 in the common buffer 406 which corresponds to the VCI of the connection in question has no address for the user data cell to be read next. In that case, no flag is set to the cell time address for the next cell read (called the next cell time address) in that storage area in the scheduling management table 901 which corresponds to the connection. Instead, the next cell time address is written to that storage area in the readable time management table 902 which corresponds to the connection. How the next cell time address is calculated has already been described above.

When a user data cell having the VCI corresponding to the connection in question has arrived anew at the common buffer 406, i.e., when one address is written to the VC queue 407 which was free and which corresponds to the VCI of the connection, that storage area in the readable time management table 902 which corresponds to the connection is referenced and the next cell time address held therein is read therefrom. If the cell read timing corresponding to the next cell time address is subsequent to the current cell read timing, a flag is set to an address in that storage area in the scheduling management table 901 which corresponds to the connection, the flag-set address corresponding to the next cell time address that is read from the readable time management table 902. If the cell read timing corresponding to the next cell time address precedes the current cell read timing, a flag is set to the cell time address next to the one corresponding to the current cell read timing in that storage area in the scheduling management table 901 which corresponds to the connection in question. In the latter case, the user data cell that has arrived anew at the common buffer 406 is immediately read therefrom.

Illustratively, as indicated by reference character B in FIG. 9, a flag is set to a cell time address "18" in that storage area in the scheduling management table 901 which corresponds to a connection k at a cell read timing "18." This allows user data cells corresponding to the connection k to be read out. If that VC queue 407 in the common buffer 406 which corresponds to the VCI for the connection k has no address for the user data cell to be read next, then no flag is set to a next cell time address "30" obtained by adding to the current cell time address "18" a cell read interval value "12" proportional to the explicit rate ER corresponding to the connection k (the absence of the flag is indicated by a hatched small circle in FIG. 9), the address "30" being located in that storage area in the scheduling management table 901 which corresponds to the connection k. Instead, the next cell time address "30" is written to that storage area in the readable time management table 902 which corresponds to the connection k.

Furthermore, as indicated by reference character C in FIG. 9, when a user data cell having the VCI corresponding to the connection k has arrived anew at the common buffer 406, that storage area in the readable time management table 902 which corresponds to the connection k is referenced and the next cell time address "30" held therein is read therefrom. If the cell read timing corresponding to the next cell time address "30" is subsequent to the current cell read timing, then a flag is set to the address corresponding to the next cell time address "30" in that storage area in the scheduling management table 901 which corresponds to the connection k (the presence of the flag is indicated by a hatched small circle in FIG. 9).

Suppose that there exist for a given cell read timing a plurality of connections for which each flag is set to the corresponding cell time address. In that case, a user cell data corresponding to one connection alone is read in accordance with an appropriate connection determining algorithm. The flags set at the cell time address in the storage areas corresponding to the other connections are each moved to the address next to the cell time address in question.

Illustratively, the connection determining algorithm may be any one of the following:

(1) An algorithm that determines each applicable connection in the order in which connections were set to the scheduling management table 901
(2) An algorithm that determines each applicable connection using a cyclic pointer pointing cyclically to each of a plurality of connections set in the scheduling management table 901
(3) An algorithm that determines each applicable connection on the basis of a priority (e.g., quality class) established for each of a plurality of connections set in the scheduling management table 901

As another alternative, where there exist for a given cell read timing a plurality of connections for which each flag is set to the corresponding cell time address, the user data cells corresponding to these connections may be placed onto the input highway 309 not only by use of a cell-free bandwidth assigned to the ABR service, but also through bandwidths assigned to other services such as CBR, rt-VBR, nrt-VBR and UBR at a time when the bandwidths are free of cells.

With the dynamic shaper 413 of the above constitution in place, suppose that at a given cell read timing, the RM cell generation unit 412 in FIG. 4 is to generate an F-RM cell corresponding to a connection for which a flag is set to the cell time address corresponding to the cell read timing in question. In that case, the user data cell corresponding to the connection is not read from the common buffer 406. Instead, the RM cell generation unit 412 outputs the F-RM cell corresponding to the connection. The interval for F-RM cell generation (=Nrm) by the RM cell generation unit 412 is given as the number of user data cells output from the time when one F-RM cell is output until the next F-RM cell is output, plus 1.

In the VS-I unit 307, the dynamic shaper 413 acts as described for each ABR connection so as to control the traffic of user data cells (and F-RM cells) placed onto the input highway 309 destined for the switch 314, on the basis of the traffic status inside the switch 314 fed back as the explicit rate ER set in the B-RM cell, and in a rapid fashion without undergoing traffic controls by the source end system 301(A) (in FIG. 3). This arrangement enhances the responsiveness of the feedback control in the ABR service.

Dynamic shaping is carried out not upon writing of user data cells to the common buffer 406 but reading of the cells from the buffer. This means that dynamic shaping is readily implemented by simply determining the next cell time address while user data cells are being held in each VC queue 407 in the common buffer 406. Under the conventional scheme of effecting dynamic shaping upon writing of user data cells to the common buffer 406, it is necessary to identify the cell time address of the user data cell corresponding to the tail address of each VC queue 407 before calculating the cell time address of a user data cell to be written anew. This complicates the processing. It is conceivably more efficient to adopt the inventive scheme of performing dynamic shaping upon reading of user data cells from the common buffer 406, as described above.

The constitution of the dynamic shaper 413 in FIG. 9 requires the scheduling management table 901 to have a storage capacity sufficient to accommodate the number of cell time addresses (n) multiplied by the number of connections (n) corresponding to the number of VC queues 407 inside the common buffer 406. An alternative to the dynamic shaper 413 thus constituted is shown in FIG. 10.

In the setup of FIG. 10, a novel scheduling management table 1001 accommodates not as many storage areas as the number of n cell time addresses for each connection, but as many pairs of a start and an end pointer each as the number of n cell time addresses. Also included in the setup of FIG. 10 is a chain table 1002 with list data which has as addresses the VCI's corresponding to all connections that are predicted to occur and which retains at each address the next VCI to be processed.

A start pointer, held at a given cell time address in the scheduling management table 1001, points to that VCI address in the chain table 1002 which corresponds to the VCI for the connection for which a user data cell is to be read from the common buffer 406 at the cell read timing corresponding to the cell time address in question.

The VCI address pointed to by the above start pointer in the chain table 1002 has that VCI address in the chain table 1002 which corresponds to the VCI of another connection for which a user data cell is to be read from the common buffer 406 at the cell read timing corresponding to the cell time address at which the start pointer is retained.

As described, the chain table 1002 has VCI's chained for one or a plurality of connections for which user data cells are to be read from the common buffer 406 at the cell read timing corresponding to a single cell time address.

An end pointer, held at a given cell time address in the scheduling management table 1001, points to that VCI address in the chain table 1002 which corresponds to the VCI for the last of connections for which user data cells are to be read from the common buffer 406 at the cell read timing corresponding to the cell time address in question.

At a given cell read timing, one VCI may be determined by the start pointers held at that cell time address in the scheduling management table 1001 which corresponds to the cell read timing in question. One address is then read from that VC queue 407 in the common buffer 406 which corresponds to the VCI in question. The user data cell is read from that cell buffer memory address in the common buffer 406 which corresponds to the retrieved address. The user data cell is output onto the input highway 309 via the CCR/MCR write unit 414 and insertion unit 415 in FIG. 4.

Thereafter, it may happen that no other VCI is held at that VCI address in the chain table 1002 which is pointed to by the start pointer at the cell time address in the scheduling management table 1001, i.e., that there exists only one connection for which a user data cell read operation is to be carried out at the cell read timing in question. In such a case, the contents of the start and end pointers are cleared from the cell time address in the scheduling management table 1001. A case will be later discussed in which further VCI's are held at that VCI address in the chain table 1002 which is pointed to by the start pointer.

Suppose that a user data cell has been read for a given connection from the common buffer 406 and that VC queue 407 in the common buffer 406 which corresponds to the VCI for the connection in question has the address of the user data cell to be read next. In that case, the above-mentioned next cell time address is calculated for the connection. Then the end pointer is read from that cell time address in the scheduling management table 1001 which corresponds to the calculated next cell time address. If the end pointer is not cleared, the VCI corresponding to the connection in question is written to that VCI address in the chain table 1002 which is pointed to by the end pointer. At the same time, the VCI is set anew as the value of the end pointer in question.

Suppose that the end pointer (together with the start pointer paired therewith) is found to be cleared, i.e., that there exists no connection for which a user data cell is to be read at the cell read timing corresponding to the cell time address. In that case, the VCI corresponding to the connection in question is set to the end pointer as well as to the start pointer paired therewith.

Meanwhile, there may be a case in which, with a user data cell read for a given connection from the common buffer 406, that VC queue 407 in the common buffer 406 which corresponds to the VCI of the connection has no address for the user data cell to be read next. In such a case, the above-mentioned next cell time address is calculated for the connection in question. The calculated next cell time address is written, as in the case of FIG. 9, to that storage area in the readable time management table 902 which corresponds to the connection, with no updates made in the chain table 1002.

When a user data cell having the VCI corresponding to the connection in question has arrived anew at the common buffer 406, i.e., when one address is written to that VC queue 407 which has been free and which corresponds to the VCI of the connection in question, that storage area in the readable time management table 902 which corresponds to the connection is referenced and the next cell time address held therein is read therefrom. An end pointer is read from that cell time address in the scheduling management table 1001 which corresponds to the next cell time address. If the end pointer is not cleared, then the VCI corresponding to the connection is written to that VCI address in the chain table 1002 which is pointed to by the end pointer, and the VCI is set anew as the value of the end pointer. If the end pointer is found to be cleared, then the VCI corresponding to the connection in question is written to the end pointer as well as to the start pointer paired therewith.

There may be a case in which, as mentioned briefly above, one VCI is determined at a given cell read timing by the start pointer held at that cell time address in the scheduling management table 1001 which corresponds to the cell read timing in question to let the user data cell corresponding to the VCI be read from the common buffer 406, and in which that VCI address in the chain table 1002 which is pointed to by the start pointer has other VCI's. In other words, there may be a case where there exist for a given cell read timing a plurality of connections for which user data cells are to be read. In that case, controls are effected as follows:

The value of the start pointer is first saved from the cell time address (called the current cell time address) next to that cell time address in the scheduling management table 1001 which has the start pointer in question. The start pointer is then set anew with the VCI value held at that VCI address in the chain table 1002 which is pointed to by the start pointer of the current cell time address. The start pointer value saved earlier is set anew to that VCI address in the chain table 1002 which is pointed to by the end pointer of the current cell time address. The values of the start and end pointers at the current cell time address are then cleared.

Figure 11:
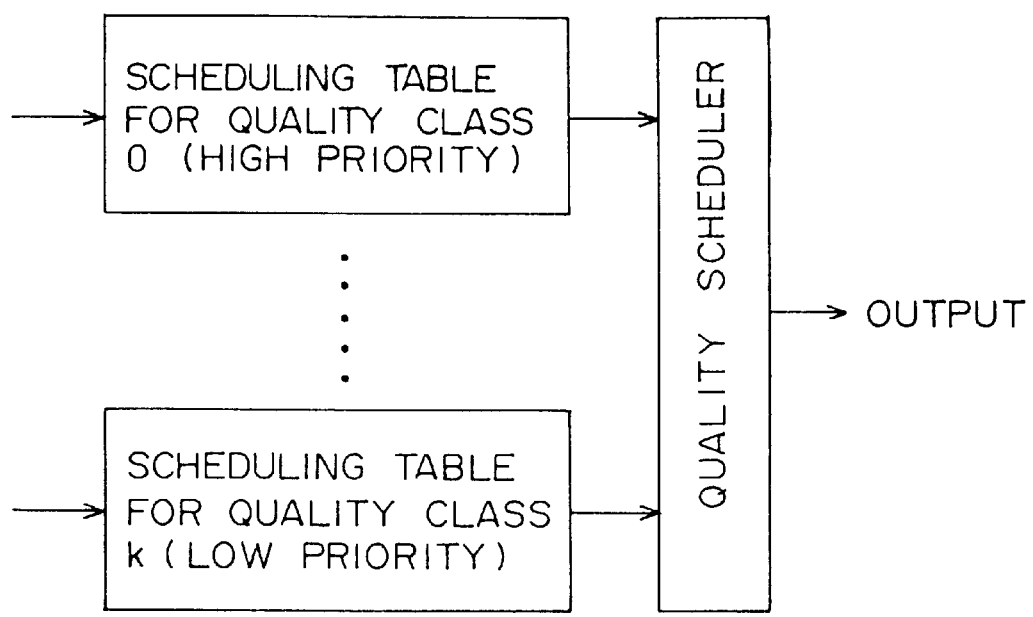
FIG. 11 is a block diagram outlining how scheduling is performed for each of the quality classes involved.

The constitution of the dynamic shaper 413 described above with reference to FIG. 10 allows the shaper to be reduced more appreciably in scale than with the setup shown in FIG. 9.

Where the VS-I unit 307 is embodied as described above inside the user network interface processor 302 (or network-network interface processor), controls including dynamic shaping regarding all quality classes are implemented by a VS-I hardware constitution common to all quality classes. Alternatively, as shown in FIG. 11, a scheduling setup based on dynamic shaping may be provided for each of a plurality of quality classes. In that case, user data cells having undergone scheduling for each quality class may be selected by quality class through the use of a quality scheduler for output. This scheme permits stricter control of traffic by quality class regarding ABR connections.

As many apparently different embodiments of this invention may be made without departing from the spirit and scope thereof, it is to be understood that the invention is not limited to the specific embodiments thereof except as defined in the appended claims.

What is claimed is:

1. A feedback control apparatus for use with a cell exchange allowing fixed-length cells to switch autonomously according to routing information attached to the cells, said feedback control apparatus feeding congestion status of said cell exchange back to an upstream device by use of a resource management cell in order to vary a cell transmission rate for said upstream device, said feedback control apparatus comprising:

virtual destination-link means used for each of a plurality of connections for terminating and looping back a forward resource management cell received over an input link connected with said upstream device, said virtual destination-link means further transmitting said forward resource management cell onto an output link connected with said upstream device so that the cell is returned as a backward resource management cell to said upstream device, whereby a upward feedback control loop is formed between said upstream device and said virtual destination-link means;

virtual source-link means used for each of said plurality of connections for newly generating a forward resource management cell and transmitting the newly generated forward resource management cell onto an output link connected with a downstream device, said virtual source-link means further terminating a backward resource management cell looped back from said downstream device and received over an input link connected with said downstream device, said virtual source-link means further transmitting user data cells onto said output link at a rate based on information set in the terminated backward resource management cell, whereby a downward feedback control loop is formed between said downstream device and said virtual source-link means;

virtual source-internal means used for each of said plurality of connections and connected with said virtual destination-link means, for newly generating a forward resource management cell and transmitting the newly generated forward resource management cell onto an input highway connected with a switch inside said cell exchange, said virtual source-internal means further terminating a backward resource management cell received over an output highway connected with said switch, said virtual source-internal means further transmitting user data cells onto said input highway at a rate based on information set in the terminated backward resource management cell, said virtual source-internal means further setting said rate based on information set in the terminated backward resource management cell to said newly generated forward resource management cell and feeding the information in said terminated backward resource management cell back to said upward feedback control loop via said virtual destination-link means; and virtual destination-internal means used for each of said plurality of connections and connected with said virtual source-link means, for terminating and looping back a forward resource management cell received over said output highway connected with said switch, said virtual destination-internal means further transmitting the looped-back forward resource management cell onto said input highway connected with said switch as a backward resource management cell destined for said virtual source-internal means, whereby an intra-switch feedback control loop is formed between said virtual source-internal means inside said cell exchange and said virtual destination-internal means, and whereby the information in the backward resource management cell terminated by said virtual source-link means is fed back to said intra-switch feedback control loop.

2. A feedback control apparatus according to claim 1, wherein said virtual source-internal means comprises:

first buffer means used for each of said plurality of connections for temporarily storing user data cells received over said input link; and first dynamic shaper means used for each of said plurality of connections for reading user data cells temporarily stored by said first buffer means for output onto said input highway at cell read intervals corresponding to an explicit rate set in said terminated backward resource management cell.

3. A feedback control apparatus according to claim 2, wherein said virtual source-internal means further comprises:

quality class management means for managing a quality class of each of said plurality of connections in accordance with quality class information attached to said user data cells every time said first buffer means temporarily stores said user data cells for each connection; and storage area appropriation control means used when said first buffer means is full of user data cells, for referencing said quality class management means to check the quality classes of the user data cells occupying said first buffer means, said storage area appropriation control means accordingly appropriating a storage area in said first buffer means from an existing user data cell of which the quality class is lower than that of the newly input user data cell, so that the appropriated storage area will temporarily store said newly input user data cell.

4. A feedback control apparatus according to claim 2, further comprising:

first queue length monitor means used for each of said plurality of connections for monitoring quantities of user data cells temporarily stored by said first buffer means; and first explicit rate change means used for each of said plurality of connections for changing, based on the result of monitoring by said first queue length monitor means, an explicit rate set in the backward resource management cell looped back by said virtual destination-link means for transmission over said output link connected with said upstream device.

5. A feedback control apparatus according to claim 2, wherein said first buffer means temporarily stores user data cells for fewer connections than a predetermined total number of connections that are allowed, and wherein said feedback control apparatus further comprises connection management means for managing the connections for which said first buffer means temporarily stores said user data cells.

6. A feedback control apparatus according to claim 5, wherein said connection management means, when a user data cell for a new connection is input to said first buffer means currently full of the user data cells for said predetermined total number of allowed connections temporarily accommodating said user data cell, removes according to a predetermined rule one of the currently managed connections as an object to be managed so as to add said new connection as a new object to be managed.

7. A feedback control apparatus according to claim 6, wherein said connection management means, when a user data cell for a new connection is input to said first buffer means currently full of the user data cells for said predetermined total number of allowed connections temporarily accommodating said user data cell, removes the most recent of currently managed connections as an object to be managed.

8. A feedback control apparatus according to claim 6, wherein said connection management means, when a user data cell for a new connection is input to said first buffer means currently full of the user data cells for said predetermined total number of allowed connections temporarily accommodating said user data cell, removes the oldest of currently managed connections as an object to be managed.

9. A feedback control apparatus according to claim 6, wherein said connection management means, when a user data cell for a new connection given as a variable bit rate service connection with a minimum cell rate of 0 is input to said first buffer means currently full of the user data cells for said predetermined total number of allowed connections temporarily accommodating said user data cell, removes as an object to be managed one of currently managed variable bit rate service connections having the minimum cell rate of 0.

10. A feedback control apparatus according to claim 5, wherein said connection management means removes, from an object to be managed, any of currently managed connections for which a new user data cell has not yet to reach said first buffer means in a predetermined time.

11. A feedback control apparatus according to claim 1, further comprising second explicit rate change means used for each of said plurality of connections for changing, based on an explicit rate set in the backward resource management cell terminated by said virtual source-internal means, an explicit rate set in the backward resource management cell looped back by said virtual destination-link means for transmission over said output link connected with said upstream device.

12. A feedback control apparatus according to claim 1, wherein said virtual source-link means comprises:

second buffer means used for each of said plurality of connections for temporarily storing user data cells received over said output highway; and second dynamic shaper means used for each of said plurality of connections for reading user data cells temporarily stored in said second buffer means for output onto said output link at cell read intervals corresponding to an explicit rate set in said terminated backward resource management cell.

13. A feedback control apparatus according to claim 12, further comprising:

second queue length monitor means used for each of said plurality of connections for monitoring quantities of user data cells temporarily stored by said second buffer means; and third explicit rate change means used for each of said plurality of connections for changing, based on the result of monitoring by said second queue length monitor means, an explicit rate set in the backward resource management cell looped back by said virtual destination-internal means for transmission over said input highway.

14. A feedback control apparatus according to claim 1, further comprising:

fourth explicit rate change means used for each of said plurality of connections for changing, based on an explicit rate set in the backward resource management cell terminated by said virtual source-link means, an explicit rate set in the backward resource management cell looped back by said virtual destination-internal means for transmission over said input highway.

15. A feedback control apparatus according to claim 1, wherein any of said plurality of connections is a variable bit rate service connection, and wherein an initial cell rate (ICR) determined upon the setting of the connection in question is dynamically varied for each call by use of a formula:

$$ICR = BW \times \alpha$$

where, BW stands for an available bandwidth of a network and $\alpha$ represents a coefficient equal to or greater than 0 and less than 1.

16. A cell exchange for use in a communications system wherein a transmission rate of any user cell is changed in accordance with information set in a resource management cell for collecting exchange congestion status, said cell exchange comprising:

an upstream device interface for receiving a first resource management cell over a line connected with an upstream device and for looping said first resource management cell back to said upstream device;

a downstream device interface for generating a second resource management cell, for transmitting the generated second resource management cell over a line connected with a downstream device, and for managing the transmission rate of user cells on the basis of information set in the looped-back resource management cell received;

an extraction unit for extracting information from said second resource management cell received by said downstream device interface;

a comparator for comparing the information extracted by said extraction unit with information set in said first resource management cell; and a change unit for changing, on the basis of the result of comparison by said comparator, the information set in said first resource management cell looped back by said upstream device interface.

* * * * *